US008300368B2

(12) United States Patent
Huang et al.

(10) Patent No.: US 8,300,368 B2
(45) Date of Patent: Oct. 30, 2012

(54) CIRCUIT INTERRUPTING DEVICE WITH END-OF LIFE TESTING, REVERSE WIRING AND HIGH VOLTAGE SURGE CAPABILITY

(75) Inventors: Huadao Huang, Wenzhou (CN); Huayang Lu, Shanghai (CN)

(73) Assignee: Huadao Huang, Yueqing (CN)

( * ) Notice: Subject to any disclaimer, the term of this patent is extended or adjusted under 35 U.S.C. 154(b) by 1044 days.

(21) Appl. No.: 12/216,952

(22) Filed: Jul. 14, 2008

(65) Prior Publication Data

US 2009/0086389 A1 Apr. 2, 2009

Related U.S. Application Data

(63) Continuation-in-part of application No. 12/000,530, filed on Dec. 13, 2007, now Pat. No. 7,940,498.

(30) Foreign Application Priority Data

Sep. 30, 2007 (CN) ...................... 2007 2 0178404 U
Sep. 30, 2007 (CN) ...................... 2007 2 0178405 U
Sep. 30, 2007 (CN) ...................... 2007 2 0178406 U
Sep. 30, 2007 (CN) ...................... 2007 2 0178407 U

(51) Int. Cl.
*H02H 3/16* (2006.01)
*H02H 9/08* (2006.01)

(52) U.S. Cl. ............ 361/42; 361/49; 361/114; 361/115

(58) Field of Classification Search .................... 361/42, 361/93.4, 49, 114, 115
See application file for complete search history.

(56) References Cited

U.S. PATENT DOCUMENTS 4,315,328 A 2/1982 Schwab
4,386,338 A 5/1983 Doyle et al.
4,518,945 A 5/1985 Doyle et al.
4,595,894 A 6/1986 Doyle et al.
4,831,496 A 5/1989 Brant et al.
5,202,662 A 4/1993 Bienwald et al.
5,594,398 A 1/1997 Marcou et al.
5,654,857 A 8/1997 Gershen
5,680,287 A 10/1997 Gernhard et al.
5,963,408 A 10/1999 Neiger et al.
6,040,967 A 3/2000 DiSalvo
6,052,265 A 4/2000 Zaretsky et al.
6,111,733 A 8/2000 Neiger et al.
6,226,161 B1 5/2001 Neiger et al.
6,246,558 B1 6/2001 DiSalvo et al.
6,252,407 B1 6/2001 Gershen
6,282,070 B1 8/2001 Ziegler et al.
6,288,882 B1 9/2001 DiSalvo et al.
6,309,248 B1 10/2001 King
6,381,112 B1 4/2002 DiSalvo
6,437,953 B2 8/2002 DiSalvo et al.
6,442,007 B1 8/2002 Li
6,469,881 B2 10/2002 Gershen et al.

(Continued)

*Primary Examiner* — Rexford Barnie
*Assistant Examiner* — Zeev V Kitov
(74) *Attorney, Agent, or Firm* — Mei & Mark, LLP

(57) ABSTRACT

The present invention provides a circuit interrupting device, preferably a ground fault circuit interrupter, which provides a quick and reliable connection/disconnection of electrical continuity through a combined use of a reset spring and a quick trip spring; an innovative circuit interrupting assembly containing a pair of input flexible metal pieces, a pair of user accessible load flexible metal pieces, and two pairs of fixed contacts on the load terminals; an automatic end-of-life testing mechanism by way of a simulated leakage current metal piece assembly; a reverse wiring protection by way of a reset start switch; an electrical surge protection through a power discharge mechanism; and a periodical end-of-life testing using a timer chip.

49 Claims, 21 Drawing Sheets

U.S. PATENT DOCUMENTS

| | | | | |
|---|---|---|---|---|
| 6,522,510 | B1 | 2/2003 | Finlay et al. | |
| 6,580,344 | B2 * | 6/2003 | Li | 335/18 |
| 6,621,388 | B1 * | 9/2003 | Macbeth | 335/18 |
| 6,671,145 | B2 | 12/2003 | Germain et al. | |
| 6,864,766 | B2 | 3/2005 | DiSalvo et al. | |
| 6,930,574 | B2 * | 8/2005 | Gao | 335/18 |
| 6,943,309 | B2 | 9/2005 | Huang et al. | |
| 6,952,150 | B2 | 10/2005 | Radosavljevic et al. | |
| 6,958,895 | B1 | 10/2005 | Radosavljevic et al. | |
| 6,963,260 | B2 | 11/2005 | Germain et al. | |
| 6,998,945 | B2 | 2/2006 | Huang et al. | |
| 7,019,952 | B2 * | 3/2006 | Huang et al. | 361/42 |
| 7,049,910 | B2 | 5/2006 | Campolo et al. | |
| 7,049,911 | B2 | 5/2006 | Germain et al. | |
| 7,068,481 | B2 | 6/2006 | Radosavljevic et al. | |
| 7,154,718 | B1 * | 12/2006 | Finlay et al. | 361/42 |
| 7,195,500 | B2 | 3/2007 | Huang et al. | |
| 7,212,386 | B1 | 5/2007 | Finlay, Sr. et al. | |
| 7,283,340 | B1 | 10/2007 | Finlay, Sr. et al. | |
| 7,295,415 | B2 | 11/2007 | Huang et al. | |
| 7,315,227 | B2 | 1/2008 | Huang et al. | |
| 7,317,600 | B2 | 1/2008 | Huang et al. | |
| 2005/0012575 | A1 | 1/2005 | Huang et al. | |

* cited by examiner

CIRCUIT INTERRUPTING DEVICE WITH END-OF LIFE TESTING, REVERSE WIRING AND HIGH VOLTAGE SURGE CAPABILITY

RELATED APPLICATION

The present application is a continuation-in-part application of U.S. patent application Ser. No. 12/000,530, filed on Dec. 13, 2007 now U.S. Pat. No. 7,940,498, which in turn claims the priority of Chinese Patent Application Nos. 200720178404.5, 200720178405.x, 200720178407.9, and 200720178406.4, which were all filed on Sep. 30, 2007, the contents of which are herein incorporated by reference.

FIELD OF THE INVENTION

The present invention relates to a circuit interrupting device, preferably a ground fault circuit interrupter, which provides a quick and reliable connection/disconnection of electrical continuity through a combined use of a reset spring and a quick trip spring; an innovative circuit interrupting assembly containing a pair of input flexible metal pieces, a pair of user accessible load flexible metal pieces, and two pairs of fixed contacts on the load terminals; an automatic end-of-life testing by way of a simulated leakage current metal piece assembly; a reverse wiring protection by way of a reset start switch; an electrical surge protection through a power discharge mechanism; and a periodical end-of-life testing using a timer chip.

BACKGROUND OF THE INVENTION

Due to increasingly higher demands for safety of ground fault circuit interrupters (GFCIs), it is desirable to provide safety measures for the GFCIs to allow an end user to find out whether the components of the GFCIs are working properly, whether the GFCIs are properly wired, and whether there is power to the output load. Additionally, it is desirable to extend the life span of the GFCIs by designing a feature that can protect the GFCIs from high voltage surge, such as lightning. The invention described below is designed to encompass the safety functions set forth above.

SUMMARY OF THE INVENTION

The present invention provides six embodiments which can be adopted by a circuit interrupting device either separately or in any combinations to provide various features and functions to the circuit interrupting device. The circuit interrupting devices of the present invention all contain a pair of line terminals, a pair of load terminals, and a pair of user accessible load terminals, which are electrically separated from each other in a tripped state and electrically connected to each other in a reset state.

The first embodiment of the present invention provides a circuit interrupting device, preferably a ground fault circuit interrupter (GFCI), which comprises a reset directional lock coupled to a reset button, and a circuit interrupting assembly. The reset directional lock comprises a reset spring and a quick trip spring, both sliding onto the reset directional lock. The reset spring is located at a top portion of the reset directional lock and the quick trip spring is located at the lower portion of the reset directional lock. The circuit interrupting device also contains a circuit interrupting assembly which can establish or disengage an electrical continuity within the circuit interrupting device.

The reset spring and the quick trip spring urges the circuit interrupting assembly toward a circuit making and/or breaking position to establish and/or disengage electrical continuity. The reset spring and quick trip spring are preferred to be separated by an insulated middle support. In one embodiment, the reset directional lock has a larger dimension in the upper portion than in the lower portion (see e.g., 35A and 35 in FIG. 6-1). In another embodiment, the reset directional lock has the same dimension in the upper and lower portions (see e.g., 35 in FIG. 6-2). In the embodiment where the reset directional lock has a larger dimension in the upper portion and a smaller dimension in the lower portion, a step is formed between the upper and the lower portions of the directional lock.

The reset spring and the quick trip spring are preferred to be coil springs with same or different sizes, although other resilient or springy structures can also be used to substitute the coil springs.

The quick trip spring is in a compressed state when the circuit interrupting device is in the reset state. This allows the quick trip spring to quickly move the circuit interrupting assembly toward the circuit breaking position when there is a fault.

The circuit interrupting assembly of the present invention contains (a) a pair of input flexible metal pieces, each having one end electrically connected to one of the pair of line terminals (i.e., the hot or neutral line terminal, respectively), the other end containing a movable contact; (b) a pair of user accessible load flexible metal pieces, each having one end electrically connected to one of the pair of user accessible load terminals, the other end containing a movable contact; and (c) a pair of fixed contacts on each of the pair of said load terminals. The movable contact on each of the pair of the input flexible metal pieces mates with one of the pair of the fixed contacts on each of the pair of the load terminals and the movable contact on each of the pair of the user accessible load flexible metal pieces mates with the other of the pair of the fixed contacts on each of the pair of load terminals to establish the electrical continuity.

The circuit interrupting device of the first embodiment further comprises a reset support piece which is rested on top of a tripping mechanism. The reset support piece and the tripping mechanism each contains a hole which is aligned with each other to allow the reset directional lock to pass through. The reset directional lock is preferred to have a flat bottom surface.

The circuit interrupting device of the first embodiment further comprises a locking member which extends into the tripping mechanism. The locking member has a through hole which is partially aligned with the tripping mechanism in the tripped state, and aligned with that in the tripping mechanism when the circuit interrupting device is resetting.

The circuit interrupting device of the first embodiment further comprises a simulated leakage current generating metal piece assembly which comprises a simulated leakage current generating metal piece, a first metal switch piece, and a second metal switch piece. The simulated leakage current generating metal piece, the first metal switch piece, and the second piece are arranged in a triangular position with the first metal switch piece located at the bottom, the second metal switch piece located in the middle, and the simulated leakage current generating metal piece located at the top. The simulated leakage current generating metal piece assembly is electrically connected to one of the pair of the line terminals (i.e., either the hot or the neutral line terminal). The simulated leakage current generating metal piece assembly generates a simulated leakage current to automatically conduct an end-of-life test when the circuit interrupting device is properly wired to an AC power. The end-of-life test ensures that the key components in the circuit interrupting device are working properly. These key components include, but are not limited to, the solenoid coil, the differential transformer, the leakage current detection IC chip, and the SCR.

The circuit interrupting device of the first embodiment further comprises a reset start switch which is closed only upon a depression of the reset button. When the circuit interrupting device is properly wired and in the tripped state, and the circuit interrupting device has passed the end-of-life test, the closing of the reset start switch allows the circuit interrupting device to be reset.

The circuit interrupting device of the first embodiment further comprises a timer chip which periodically outputs a control signal to cause the circuit interrupting device to trip.

The circuit interrupting device of the first embodiment further comprises a power discharge mechanism which contains a pair of input power connecting pieces, each being electrically connected to a hot or a neutral line terminal respectively. Each of the input power connecting pieces has an end extended to a discharge metal piece having a tip. The tip of the discharge metal piece of one input power connecting piece faces, but does not contact with, the tip of the discharge metal piece from the other input power connecting piece. During a high voltage surge, the discharge mechanism causes a discharge of electricity through the tips of the discharge metal pieces to protect the circuit interrupting device from being damaged due to the high voltage surge.

The circuit interrupting device of the first embodiment further comprises a test button. The depression of the test button generates a simulated leakage current to conduct a manual end-of-life test of the circuit interrupting device to ensure that the key components of the circuit interrupting device are working properly. The key components include, but are not limited to, the solenoid coil, the differential transformer, the leakage current detection IC chip, and the SCR.

The second embodiment of the present invention contains a circuit interrupting device having a circuit interrupting assembly which comprises (a) a pair of input flexible metal pieces, each having one end electrically connected to one of the pair of the line terminals, the other end containing a movable contact; (b) a pair of user accessible load flexible metal pieces, each having one end electrically connected to one of the pair of the user accessible load terminals, the other end containing a movable contact; and (c) a pair of fixed contacts on each of the pair of the load terminals. The movable contact on each of the pair of the input flexible metal pieces mates with one of the pair of the fixed contacts on each of the pair of the load terminals and the movable contact on each of the pair of the user accessible load flexible metal pieces mates with the other of the pair of the fixed contacts on each of the pair of the load terminals to provide electrical continuity in the reset state. The movable contact on each of the pair of the input flexible metal pieces disengages from one of the pair of the fixed contacts on each of the pair of the load terminals and the movable contact on each of the pair of the user accessible load flexible metal pieces disengages from the other of the pair of the fixed contacts on each of the pair of the load terminals to break the electrical continuity in the tripped state.

The end of the input flexible metal piece is preferred to pass through a differential transformer and be welded to a circuit board.

The circuit interrupting device of the second embodiment further comprises a tripping mechanism having a pair of lifting arms extended outward. The pair of the input flexible metal pieces and the pair of the user accessible load flexible metal pieces of the circuit interrupting assembly are rest on the pair of the lifting arms of the tripping mechanism. The tripping mechanism urges the pair of the input flexible metal pieces and the pair of the user accessible load flexible metal pieces of the circuit interrupting assembly to move upward or downward to mate with or disengage from the pair of the fixed contacts on each of the pair of the load terminals to establish or break electrical continuity in the circuit interrupting device.

The circuit interrupting device of the second embodiment further comprises a reset support piece resting on top of the tripping mechanism. Both the reset support piece and the tripping mechanism contain a hole aligned with each other to receive a reset directional lock which is coupled to a reset button. The reset directional lock contains a reset spring and a quick trip spring. The pair of the input flexible metal pieces is rested between the reset support piece and the tripping mechanism.

The circuit interrupting device of the second embodiment, further comprises a simulated leakage current generating metal piece assembly which contains a simulated leakage current generating metal piece, a first metal switch piece, and a second metal switch piece. The simulated leakage current generating metal piece, the first metal switch piece, and the second metal piece are arranged in a triangular position with the first metal switch piece located at the bottom, the second metal switch piece located in the middle, and the simulated leakage current generating metal piece located at the top. The simulated leakage current generating metal piece comprises a contact which is in contact with one of the pair of the input flexible metal pieces when the circuit interrupting device is in the tripped state. When the circuit interrupting device is properly wired and in the tripped state, the simulated leakage current generating metal piece generates a simulated leakage current to automatically conduct an end-of-life test of the circuit interrupting device to ensure that the key components of the circuit interrupting device are working properly. The key components that can be detected by the simulated leakage current include, but are not limited to, the solenoid coil, the differential transformer, the leakage current detection IC chip, and the SCR. After the circuit interrupting device is reset, the simulated leakage current generating metal piece is separated from one of the pair of the input flexible metal pieces and stops generating the simulated leakage current. The one of the pair of the input flexible metal pieces is preferred to be a neutral input flexible metal piece.

The circuit interrupting device of the second embodiment further comprises a reset start switch which is closed only upon a depression of the reset button. When the circuit interrupting device is properly wired and in the tripped state, and the circuit interrupting device has passed the end-of-life test, the closing of the reset start switch allows the circuit interrupting device to be reset.

The circuit interrupting device of the second embodiment further comprises a timer chip which periodically outputs a control signal to cause the circuit interrupting assembly to trip.

The circuit interrupting device of the second embodiment further comprises a power discharge mechanism. During a high voltage surge, the discharge mechanism causes a discharge of electricity to protect the circuit interrupting device from being damaged due to the high voltage surge.

The circuit interrupting device of the second embodiment further comprises a test button. A depression of the test button generates a simulated leakage circuit to manually conduct an end-of-life test of the components of said circuit interrupting device. When all of the key components are working properly, the circuit interrupting device can be reset.

The third embodiment of the present invention provides a circuit interrupting device comprises a simulated leakage current generating metal piece which is electrically connected to one of the pair of line terminals when the circuit interrupting device is in the tripped state, and electrically separated from the line terminals when the circuit interrupting device is in the reset state. When the circuit interrupting device is properly wired and in the tripped state, the simulated leakage current generating metal piece generates a simulated leakage current to automatically conduct an end-of-life test of the circuit interrupting device to ensure that the key components of the circuit interrupting device are working properly. The key components that can be detected by the simulated leakage current include, but are not limited to, the solenoid coil, the differential transformer, the leakage current detection IC chip, and the SCR. The simulated leakage current generating metal piece has a contact which is in contact with an input flexible metal piece that is electrically connected to one of the pair of the line terminals when the circuit interrupting device is in the tripped state. The contact of the simulated leakage current generating metal piece is separated from the input flexible metal piece when the circuit interrupting device is in the reset state.

The input flexible metal piece is preferred to be electrically connected to a neutral line terminal, in which case, one end of the simulated leakage current generating metal piece is electrically connected to the neutral line terminal, and the other end of the simulated leakage current generating metal piece is in series with a simulated leakage current generating resistor, and is electrically connected to a hot line terminal via a solenoid coil. The simulated leakage current generating metal piece is a part of a simulated leakage current generating metal piece assembly which comprises, in addition to the simulated leakage current generating metal piece, a first metal switch piece and a second metal switch piece. The first metal switch piece has a contact which mates with a contact on the second metal switch piece when said circuit interrupting device is in the reset state and separated from each other when the circuit interrupting device is in the tripped state. The mating of the first metal switch piece and the second metal switch piece puts the circuit interrupting device in a working condition, i.e., allowing the circuit interrupting device to trip when a ground fault is detected. The simulated leakage current generating metal piece, the first metal switch piece, and the second piece are arranged in a triangular position with the first metal switch piece located at the bottom, the second metal switch piece located in the middle, and the simulated leakage current generating metal piece located at the top. When the circuit interrupting device is properly wired and in the tripped state, the first metal switch piece, the second metal switch piece, and the simulated leakage current generating metal piece are separated from each other.

The simulated leakage current generating metal piece does not contact with the first metal switch piece and/or the second metal switch piece in either the tripped or the reset state.

One end of the first metal switch piece is electrically connected to a line terminal via a solenoid coil, the other end is suspended below the second metal switch piece. The preferred line terminal that is electrically connected to the first metal switch piece is a hot line terminal. One end of the second metal switch piece is electrically connected to a positive pole (i.e, the anode) of the SCR, the other end of the second metal switch piece is suspended above the first metal switch piece. The mating of the first metal switch piece with the second metal switch piece allows the SCR to be connected to the solenoid coil. However, without a fault signal (e.g., a ground fault or a simulated leakage current signal) going to the gate of the SCR, the solenoid coil cannot be activated by the mating of the first metal switch piece with the second metal switch piece to cause the circuit interrupting device to trip.

The circuit interrupting device of the third embodiment further comprises a reset start switch which is closed only when a reset button is depressed by a user. When the circuit interrupting device is properly wired and in the tripped state, and the circuit interrupting device has passed the end-of-life detection, the closing of the reset start switch allows the circuit interrupting device to reset.

The circuit interrupting device of the third embodiment further comprises a timer chip which periodically outputs a control signal to cause the circuit interrupting device to trip. The timer chip allows the circuit interrupting device to periodically conduct the end-of-life test by tripping the circuit interrupting device which triggers an automatic generation of the simulated leakage current by the simulated leakage current generating metal piece.

The circuit interrupting device of the third embodiment further comprises a power discharge mechanism. During a high voltage surge said discharge mechanism causes a discharge of electricity to protect said circuit interrupting device from being damaged due to the high voltage surge.

The circuit interrupting device of the third embodiment further comprises a test button. A depression of the test button generates a simulated leakage current to conduct a manual end-of-life test of the circuit interrupting device.

The fourth embodiment of the present invention provides a circuit interrupting device which comprises a reset start switch. The reset start switch can be closed only for a duration of time when an user depresses a reset button and when the circuit interrupting device is in the tripped state. The closing of the reset start switch allows the circuit interrupting device to reset on the condition that prior to or at the time the reset start switch is closed, a simulated leakage current signal is sent to the gate of a silicon controlled rectifier (SCR).

The reset start switch comprises a metal switch piece and an electric contact. One end of the metal switch piece is electrically connected to one of the pair of the line terminals via a solenoid coil and the other end is suspended. The electric contact is electrically connected to a positive pole (i.e., the anode) of a silicon controlled rectifier (SCR). The simulated leakage current signal is generated by a simulated leakage current generating metal piece which is electrically connected to one of the pair of line terminals when the circuit interrupting device is properly wired and in the tripped state. The simulated leakage current signal is generated when the components of the circuit interrupting device are working properly. The simulated leakage current signal is sent by a leakage current detection IC chip to the gate of the SCR. The closing of the reset start switch in the presence of the simulated leakage current signal allows a solenoid coil to be energized to urge a circuit interrupting assembly moving toward a circuit closing position to establish an electrical continuity of the circuit interrupting device. On the other hand, nothing happens if the reset start switch closes when there is no simulated leakage current signal. The closing of the reset start switch in the presence of the simulated leakage current signal allows the electric contact to be electrically connected to the other of the pair of line terminals (i.e., if the metal switch piece is electrically connected to the hot line terminal, the closing of the metal switch piece with the electric contact in the presence of a simulated leakage current signal at the gate of the SCR allows the electric contact to be electrically connected to the neutral line terminal, and vice versa). The circuit interrupting device of the fourth embodiment further comprises a power discharge mechanism to protect the circuit interrupting device from being damaged due to a high voltage surge.

The circuit interrupting device of the fourth embodiment, further comprises a timer chip which periodically outputs a control signal to cause said circuit interrupting device to trip.

The fifth embodiment of the present invention provides a circuit interrupting device which comprises a power discharge mechanism having a pair of input power connecting pieces, each being electrically connected to a hot or a neutral line terminal respectively. Each of the input power connecting pieces has an end extended to a discharge metal piece having a tip. The tip of the discharge metal piece of one input power connecting piece faces, but does not contact with, the tip of the discharge metal piece from the other input power connecting piece. The circuit interrupting device further contains a timer chip that periodically outputs a control signal to cause the circuit interrupt device to trip. When the circuit interrupting device is tripped, a simulated leakage current generating metal piece generates a simulated leakage current to perform an automatic end-of-life test of the circuit interrupting device. In this embodiment, the hot line terminal is electrically connected to the neutral line terminal through a solenoid coil and a metal oxide varistor (MOV), which provides additional protection to a high power surge.

During a high voltage surge, the discharge metal pieces of the input power connecting pieces cause a discharge of electricity through the tips of the discharge metal pieces to protect the circuit interrupting device from being damaged due to the high voltage surge. An example of the high voltage surge is a lightning.

Finally, the sixth embodiment of the present invention provides a circuit interrupting device which comprises a timer chip which periodically sends out a signal to a gate of a silicon controlled rectifier (SCR) to cause the circuit interrupting device to trip when the circuit interrupting device is in the reset state. The timer chip allows the circuit interrupting device to periodically conduct an end-of-life test. The end-of-life test is performed by a simulated leakage current generating metal piece which automatically generates a simulated leakage current when the circuit interrupting device is properly wired and in the tripped state. When the key components in the circuit interrupting device are working properly, a simulated leakage current signal from the leakage current detection IC chip (IC1) is sent to said gate of said SCR. The key components that can be detected by the simulated leakage current include, but are not limited to, the solenoid coil, the differential transformer, the leakage current detection IC chip, and the SCR.

A depression of a reset button after the simulated leakage current signal is sent to the gate of said SCR allows the circuit interrupting device to be reset.

DETAILED DESCRIPTION OF THE INVENTION

Figure 1:
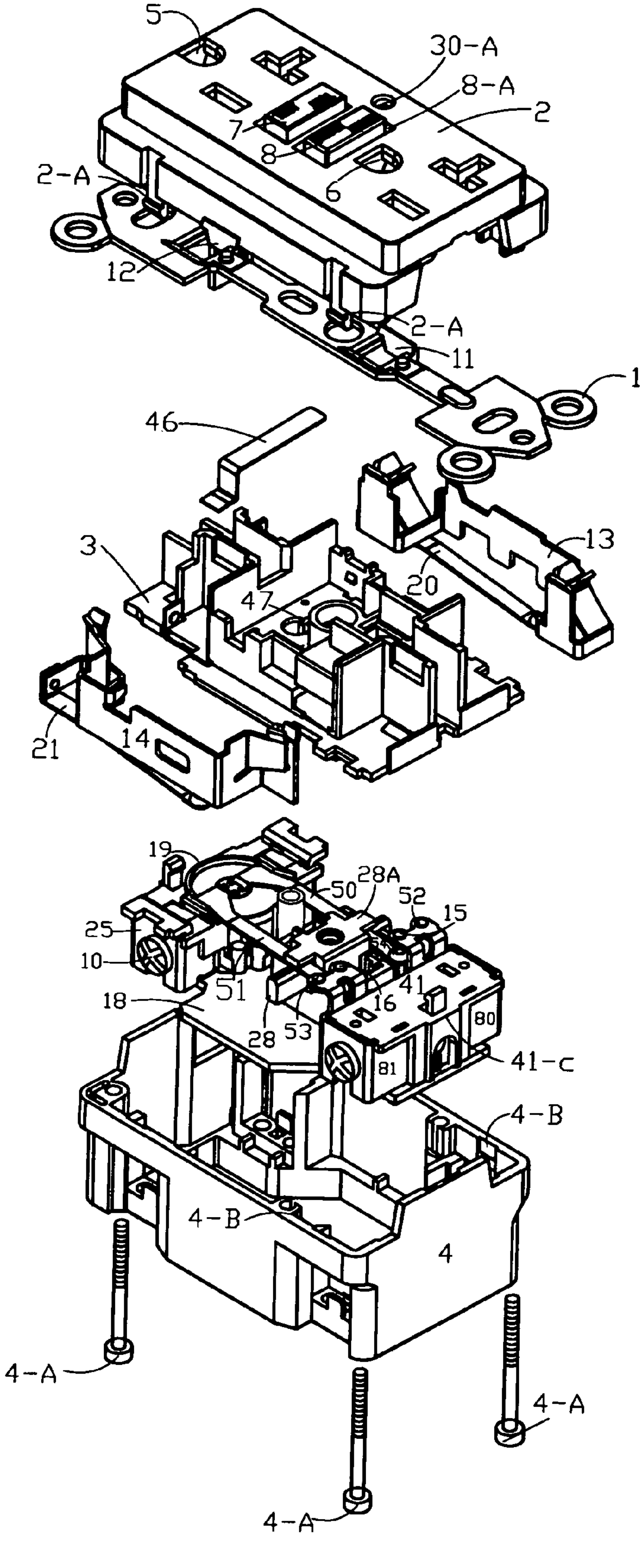
FIG. 1 is an exploded cubic schematic of the structure of the present invention.

As shown in FIG. 1, the GFCI disclosed by the present invention mainly comprises a housing, and a circuit board 18 which is installed inside the housing.

Within the housing, there are upper cover 2, insulated middle support 3 and base 4. Between upper cover 2 and insulated middle support 3, there is metal mounting strap 1. Circuit board 18 is installed between insulated middle support 3 and base 4.

Figure 2:
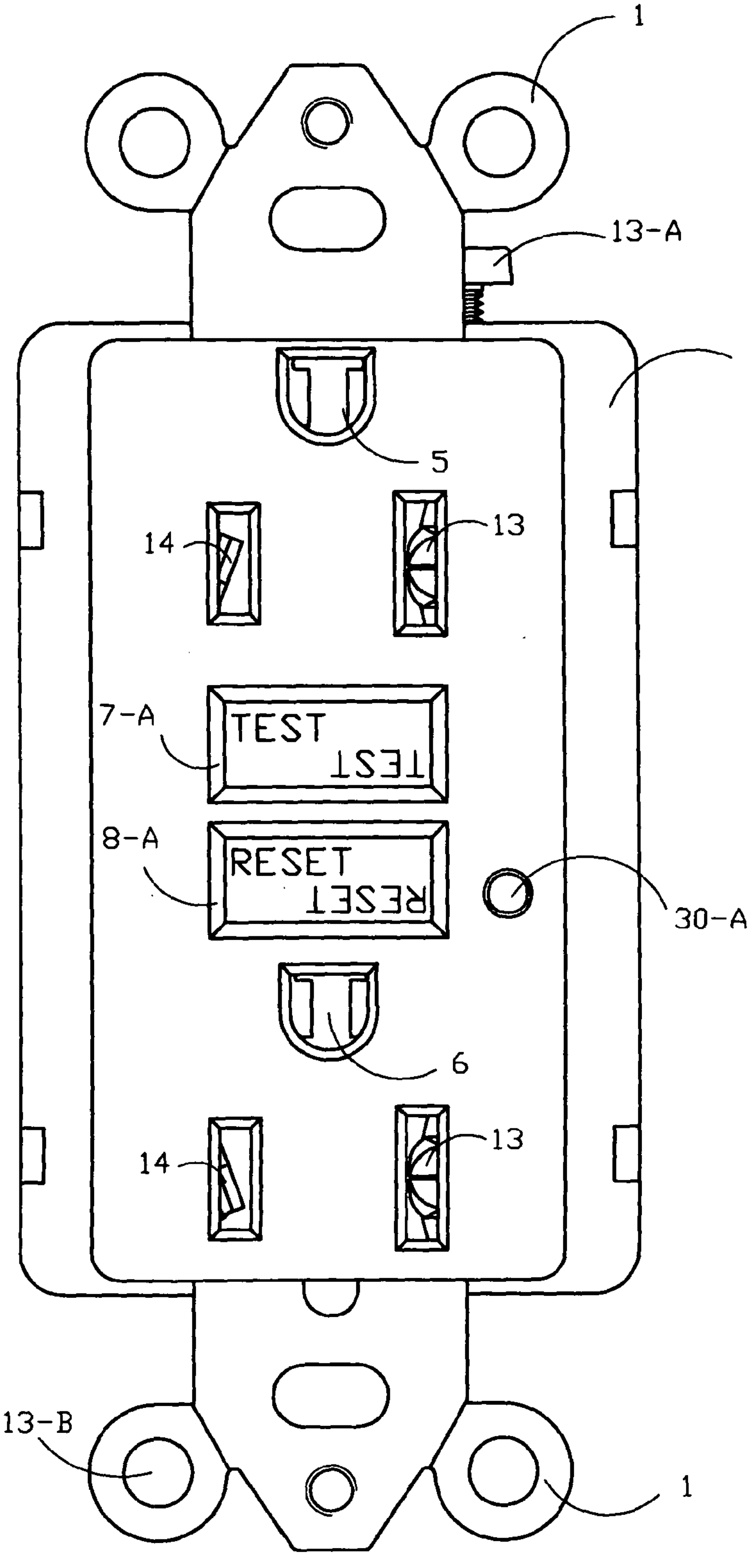
FIG. 2 is the main view of the present invention.

As shown in FIG. 1 and FIG. 2, upper cover 2 contains power output sockets 5 and 6, reset button hole 8-A, test button hole 7-A and status indicator hole 30-A. Reset button (RESET) 8 and test button (TEST) 7 are placed inside reset button hole 8-A and test button hole 7-A, respectively. Reset button 8 and test button 7 pass through metal strap 1 and insulated middle support 3, and come into contact with the component assembly on circuit board 18. There are four clamp hooks 2-A on both sides of upper cover 2 which are used to securely connect base 4 through fasten groove 4-B located on the inner side of base 4.

Metal mounting strap 1 is located between upper cover 2 and insulated middle support 3, and is connected to the ground through grounding screw 13-A. Grounding vanes 11 and 12 are located on metal mounting strap 1, at locations vertically corresponding to the grounding holes on power output sockets 5 and 6 of upper cover 2. Installation holes 13-B are placed on both ends of metal mounting strap 1.

Figure 3:
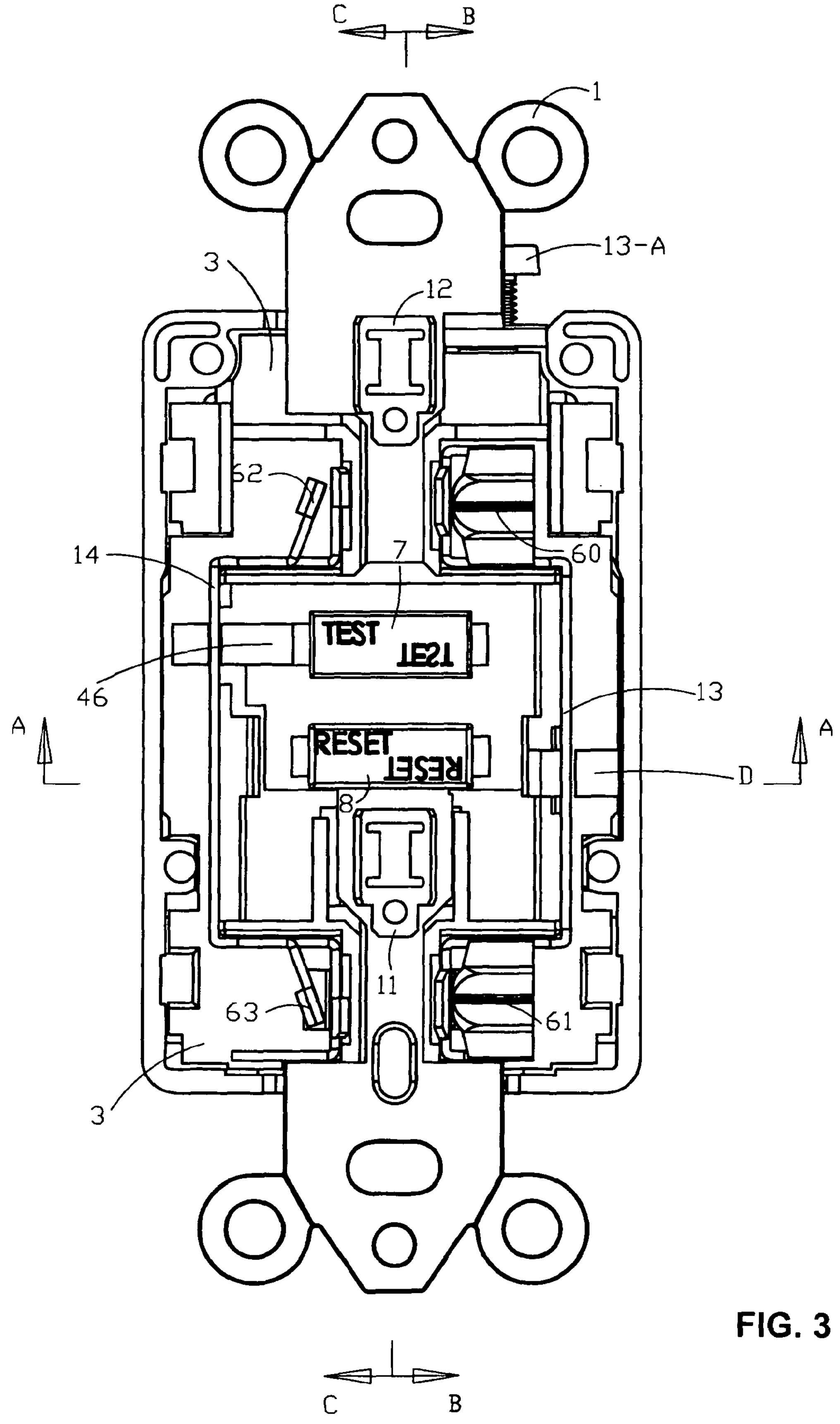
FIG. 3 is the front view of the present invention with the upper lid removed.

As shown in FIG. 1 and FIG. 3, a hot user accessible load conductor 14 and a neutral user accessible load conductor 13 are respectively placed on both sides of insulated middle support 3 within the housing and extended to contain gripping wing pieces 60, 61, 62 and 63. Gripping wing pieces 60, 61, 62 and 63 are located directly under the neutral power line holes and hot power line holes of power output sockets 5 and 6 of upper cover 2.

As shown in FIG. 1, base 4 is used to accommodate insulated middle support 3 and control circuit board 18. On the two sides of base 4, a pair of neutral power line and hot power line input wiring screws 9 and 10 and a pair of neutral power line and hot power line output wiring screws 109 and 110 are symmetrically placed.

The core component of the present invention is control circuit board 18 which is installed within the housing. It has the functions of causing power outlet sockets 5 and 6 on upper cover 2 of the GFCI and power output wiring screws 109 and 110 located on both sides of base 4 to have or not to have power output; testing the components of the GFCI to determine whether these components have come to an end of their service life; displaying the test result by indicator lights on upper cover 2 and causing the reset button to reset or to trip; and protecting the device against high voltage surge such as lightning.

Figure 5:
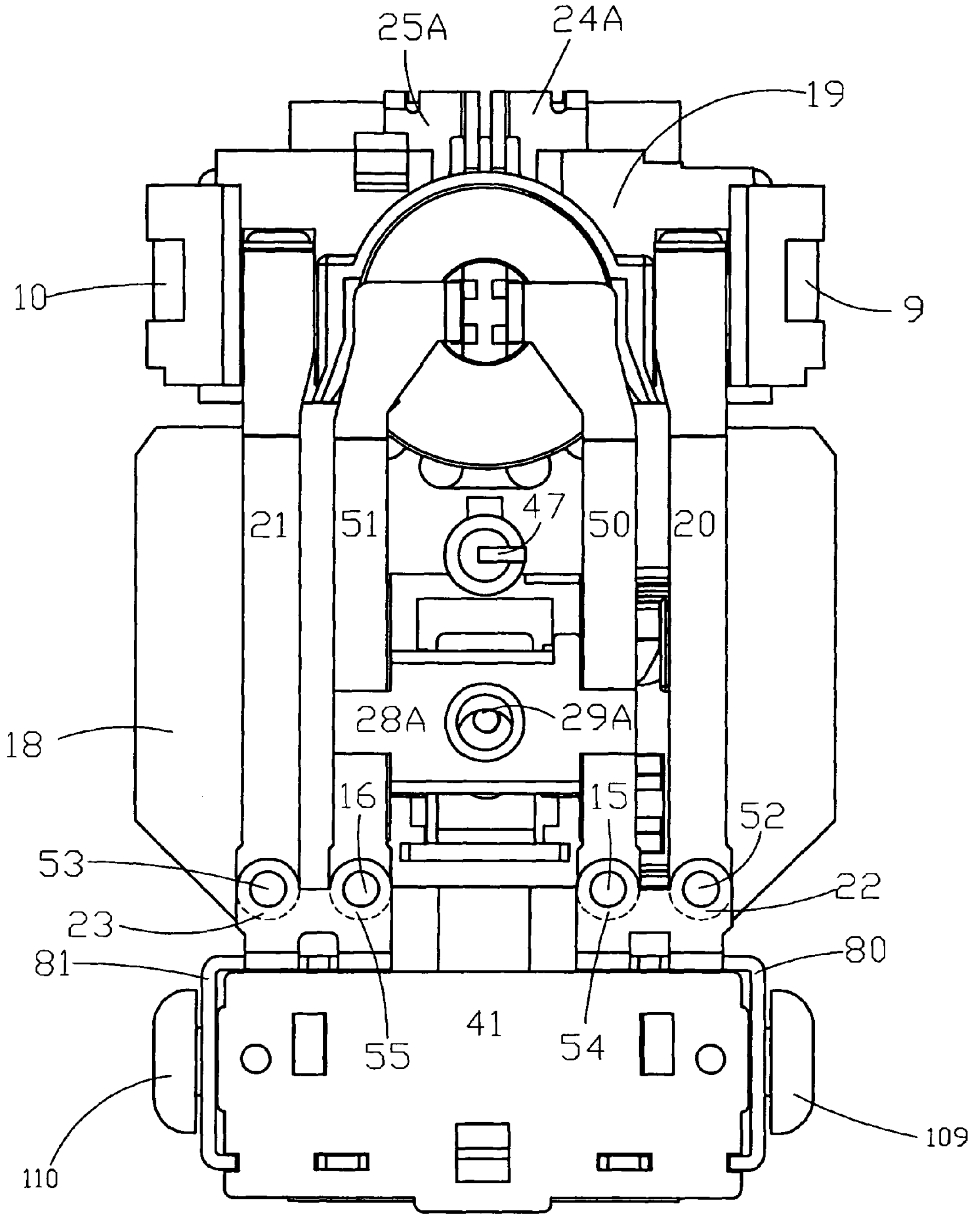
FIG. 5 is an illustration of the relationships among the parts which can be viewed on top of the printed circuit board of the present invention.

As shown in FIG. 1 and FIG. 5, on circuit board 18, there are a pair of hot power line and neutral power line input flexible metal pieces 51 and 50. One end of power input flexible metal pieces 51 and 50 is bent 90 degrees downward to facilitate power input flexible metal pieces 51 and 50 to pass through differential transformer 19. The power input flexible metal pieces 51 and 50 can either weld onto circuit board 18 or directly connect to hot power line, neutral power input wiring screws 10 and 9 through input power connecting pieces 25 and 24. Hot power input wiring screw 10 is connected to a hot power line inside the wall through a wire. Neutral power input wiring screw 9 is connected to a neutral power line inside the wall through a wire. Movable contacts 55 and 54 are placed on the other end of input flexible metal pieces 51 and 50.

Hot and neutral power output terminal metal pieces 81 and 80 are welded onto the other end of circuit board 18 and come into contact with power output wiring screws 110 and 109. Hot and neutral power output terminal metal pieces 81 and 80 contain fixed contacts 53,16 and 52,15 respectively which are protruded sideward from the metal pieces.

Figure 4B:
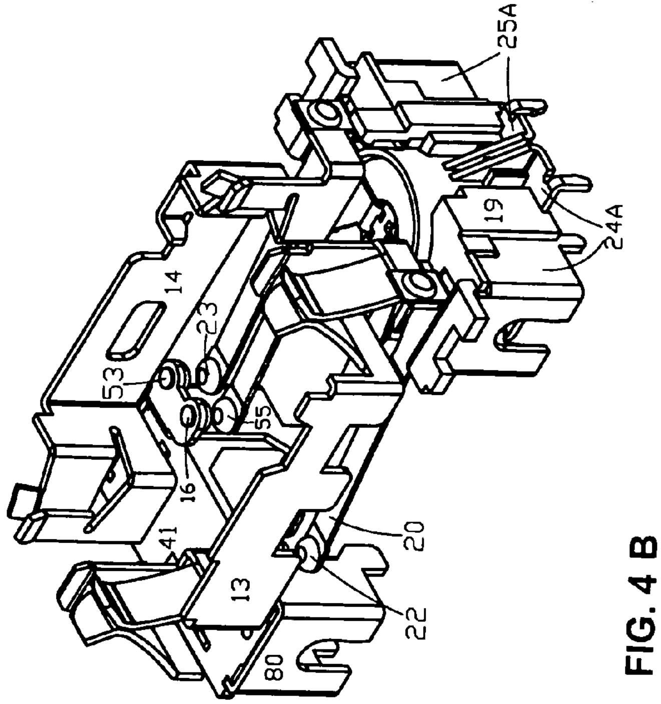
FIG. 4A and FIG. 4B are illustrations of the relationships among the input flexible metal pieces, the user accessible load flexible metal pieces, and the fixed contacts on the load terminals of the present invention and their structures.
Figure 4A:
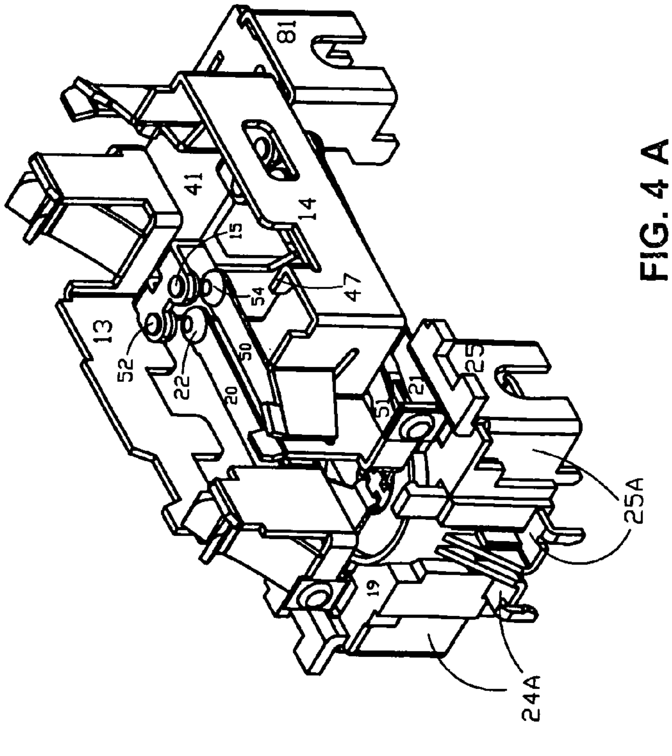

As shown in FIG. 4A and FIG. 4B, on one end of hot user accessible load conductor 14, there is a user accessible load flexible metal piece 21 which is connected to the user accessible load conductor 14 by a rivet. A movable contact 23 is attached to the end of user accessible load flexible metal piece 21. Similarly, at one end of neutral user accessible load conductor 13, there is a user accessible load flexible metal piece 20 which is connected to the neutral user accessible load conductor 13 by a rivet. A movable contact 22 is attached to the end of user accessible load flexible metal piece 20.

As shown in FIG. 5, movable contacts 55 and 54 on power input flexible metal pieces 51 and 50 respectively come into contact with or disconnect from fixed contacts 16 and 15 on load terminals 81 and 80, forming a group of hot line/neutral line to hot load/neutral load power switches. Movable contacts 23 and 22 on the pair of user accessible load flexible metal pieces 21 and 20 come into contact with or disconnect from fixed contacts 53 and 52 on power load terminals 81 and 80, forming another group of hot line/neutral line to hot user accessible load/neutral user accessible load power switches. As shown in FIG. 4A, there is a pair of fixed contacts 15, 52 on hot output terminal 80. As shown in FIG. 4B, there is a pair of fixed contacts 16, 53 on neutral output terminal 81.

Figure 11A:
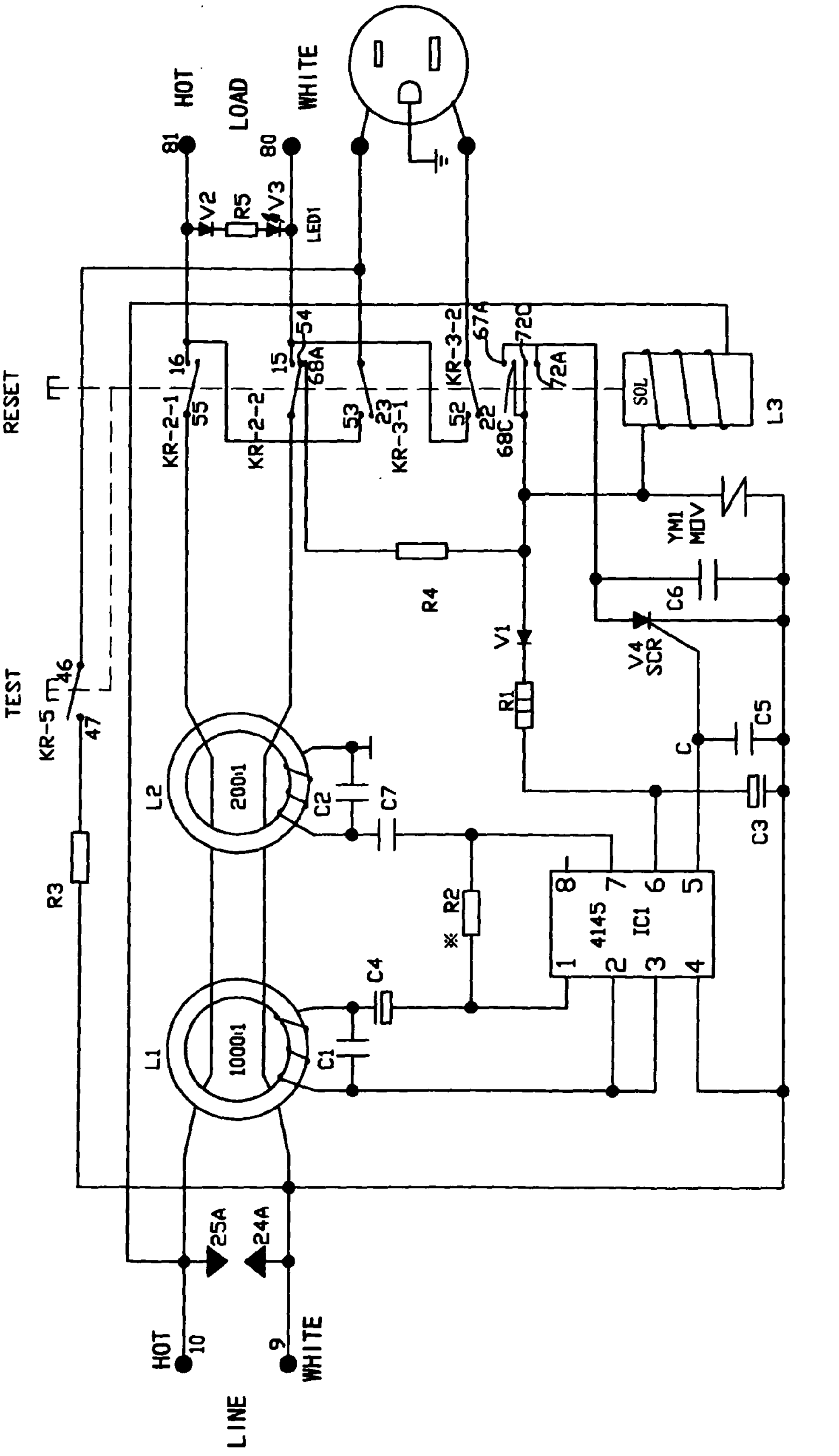
FIG. 11A and FIG. 11B illustrate exemplary detailed circuitries on the control circuit board of the GFCI of the present invention.
Figure 11B:
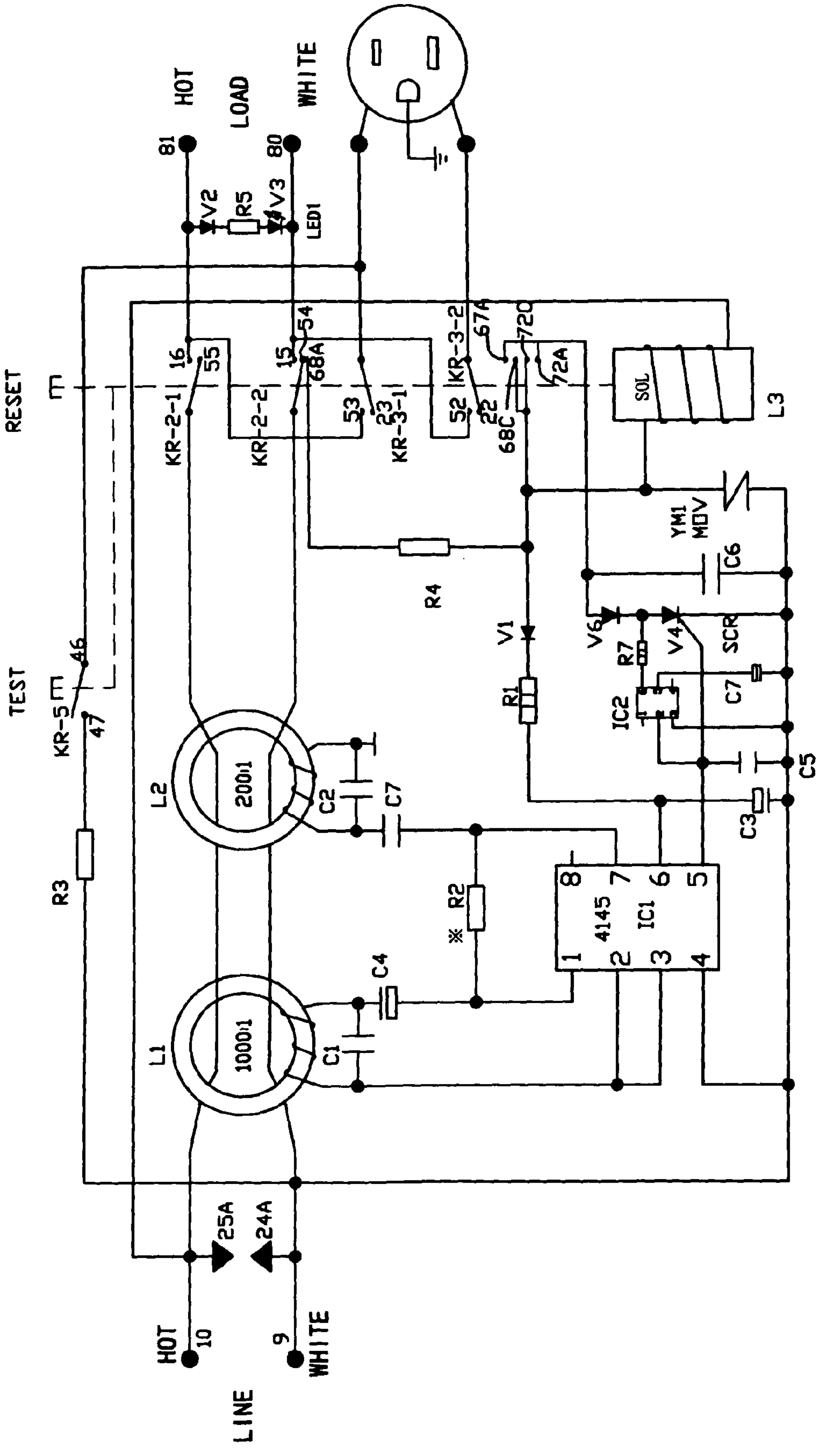

The mating between movable contacts 55, 54 on power input flexible metal pieces 51 and 50 of hot and neutral line terminals 24, 25, and fixed contacts 16, 15 on hot and neutral load terminals 80 and 81; and the mating between movable contacts 23, 22 on user accessible load flexible metal piece 21, 20 on hot and neutral user accessible load conductors 14, 13, form a total of four sets of power switches, i.e., 55 and 16, 54 and 15, 23 and 53, and 22 and 52, which respectively correspond to switches KR-2-1, KR-2-2, KR-3-1 and KR-3-2 in wiring diagram in FIG. 11A and FIG. 11B.

Figure 7A:
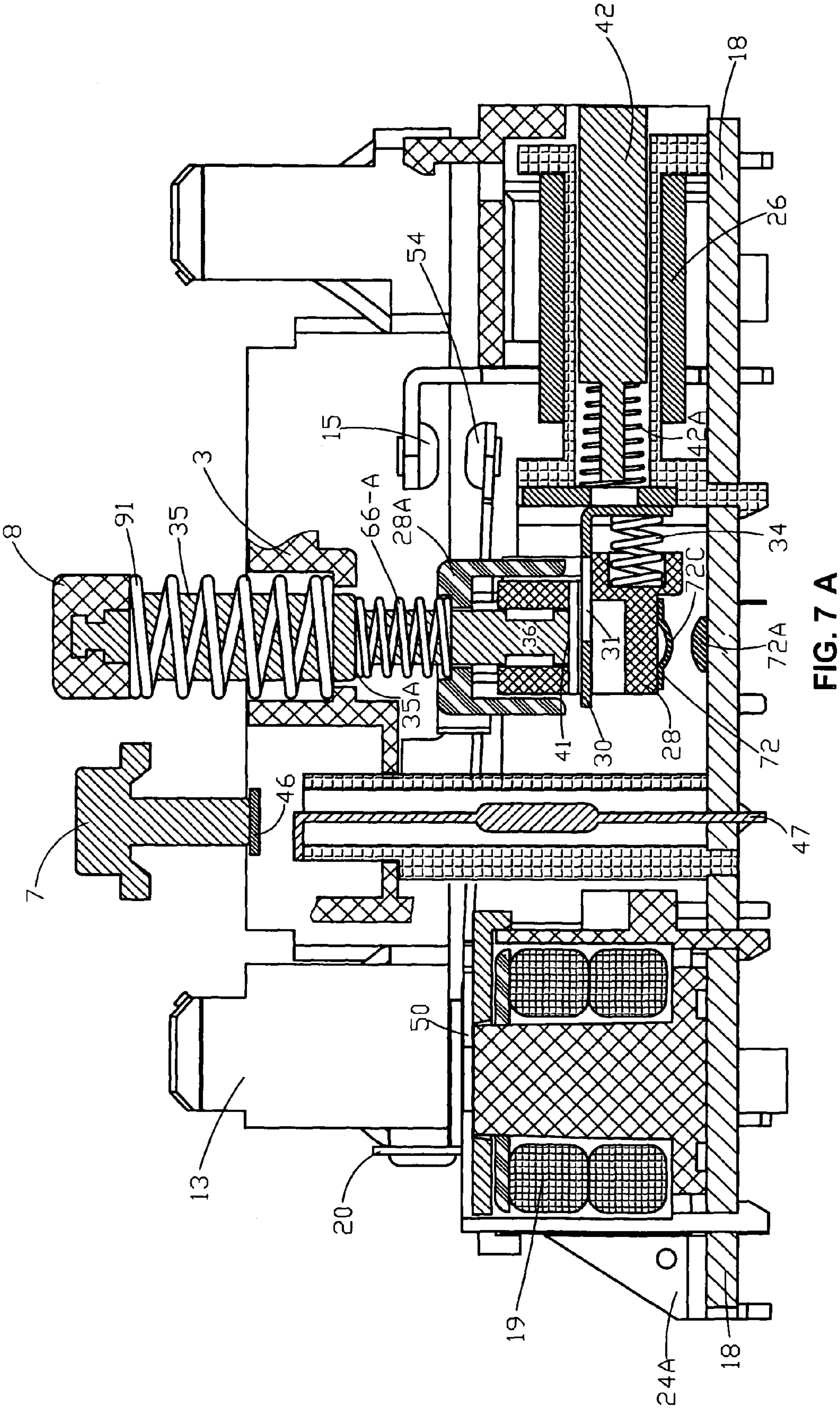
FIG. 7A is a partial cross-sectional view along the B-B line in FIG. 3. It is an illustration of the relationships among the parts how the GFCI works initially when there is no power output.

As shown in FIG. 1, FIG. 5 and FIG. 7A, there is also a differential transformer 19 on circuit board 18 which is used for detecting leakage currents. As shown in FIG. 11A and FIG. 11B, the hot power line HOT and neutral power line WHITE pass through differential transformer 19 (L1 and L2 in the figures). When there is a leakage current (i.e., an imbalance current between the hot and white lines) on the power supply loop, the differential transformer will output a voltage signal to the leakage current detection control chip IC1 (model No. RV4145). Pin 5 of the chip IC1 outputs a control signal to silicon controlled rectifier (SCR) V4, causing the reset/tripping mechanical device on circuit board 18 to act, so that reset button 8 pops up and the GFCI trips, cutting off the power output from the GFCI.

As shown in FIG. 1, FIG. 5, FIG. 6, FIG. 7A, FIG. 9A, and FIG. 10A, a reset/tripping mechanical device is also placed on circuit board 18 which causes input flexible metal pieces 50 and 51 to be electrically connected to or disconnected from fixed contacts 15, 16 on power output terminals 80 and 81, and causes user accessible load flexible metal pieces 20 and 21 to be electrically connected to or disconnected from fixed contacts 52, 53 of power output terminals 80 and 81. The reset/tripping mechanical device includes a reset directional lock 35 which is coupled to reset button 8; reset spring 91 and quick trip spring 66-A which are slid onto directional lock 35; a reset support piece 28A; a "T" shaped tripping mechanism 28 which is under reset button 8 and has a through hole 29 where reset directional lock 35 can pass through; locking member 30; locking member spring 34; simulated leakage current generating metal piece assembly, i.e., first metal switch piece 66, second metal switch piece 67 and simulated leakage current generating metal piece 88; reset start switch, i.e., metal switch piece 72 and electric contact 72A, and solenoid coil 26.

"T" shaped tripping mechanism 28 is located directly below reset button 8 and is coupled to reset button 8. The left and right sides of "T" shaped tripping mechanism 28 extend outward to form a pair of lifting arms, i.e., cantilevers. Reset support piece 28A is located below reset button 8 and above "T" shaped tripping mechanism 28. Reset support piece 28A can be combined with tripping mechanism 28 and move up and down with tripping mechanism 28. At the same time, reset support piece 28A can also be detached from tripping mechanism 28. In solenoid framework 26K of solenoid coil 26 which accommodates reset support piece 28A and tripping mechanism 28, there is a limiting block 26H which limits the lowest possible movement of reset support piece 28A.

Figure 10A:
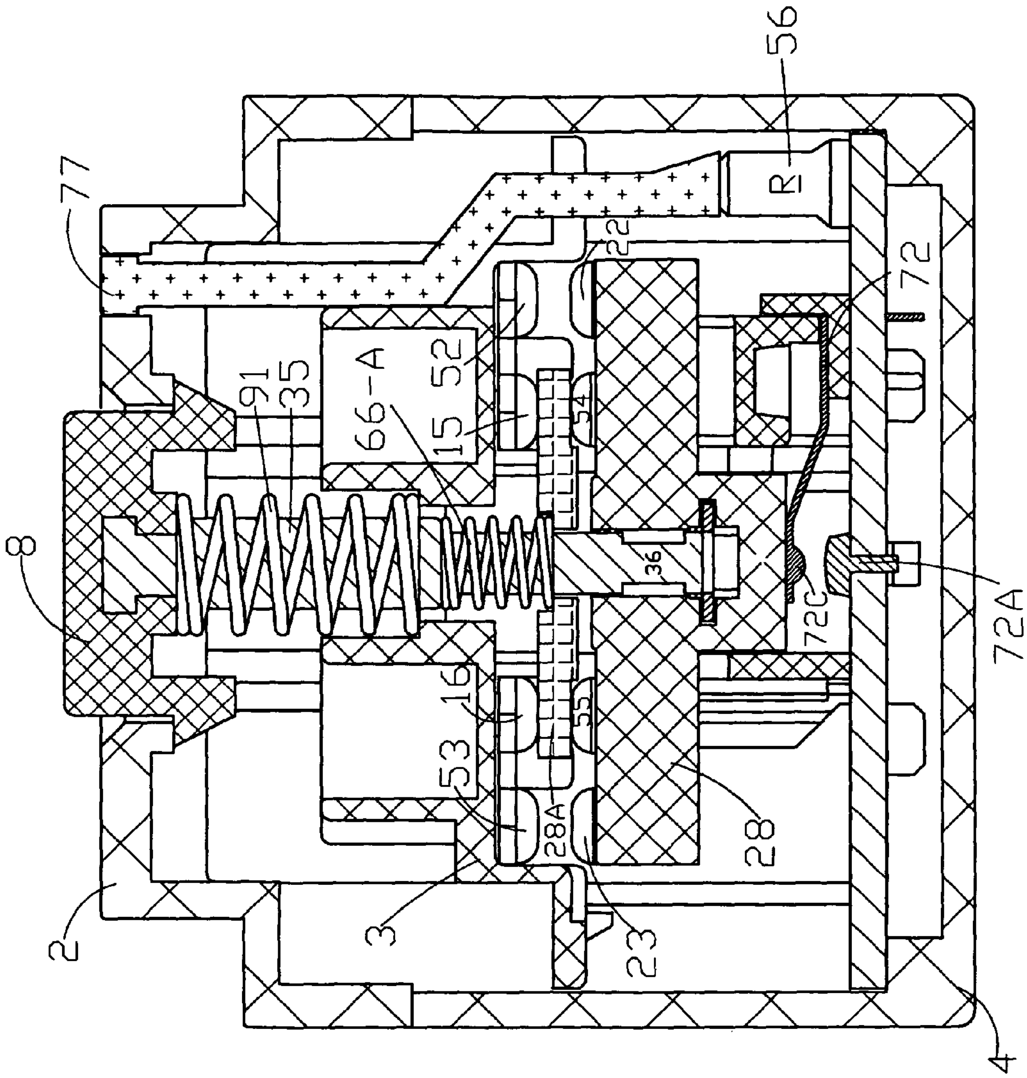
FIG. 10A is a partial cross-sectional view along the A-A line in FIG. 3. It is an illustration of the relationships among the parts when the device is in a tripped state.

As shown in FIG. 10A, when tripping mechanism 28 and reset support piece 28A are assembled, input flexible metal pieces 51 and 50 and user accessible load flexible metal pieces 21 and 20 are respectively placed above the left and right lifting arms of tripping mechanism 28 and below reset support piece 28A, so that input flexible metal pieces 51 and 50 are located between the listing arms of tripping mechanism 28 and reset support piece 28A. At the same time when tripping mechanism 28 moves up and down due to the movement of reset button 8 and reset directional lock 35, input flexible metal pieces 51 and 50 and user accessible load flexible metal pieces 21 and 20 are also driven by the movement of reset button 8 to move up and down.

Figure 6A:
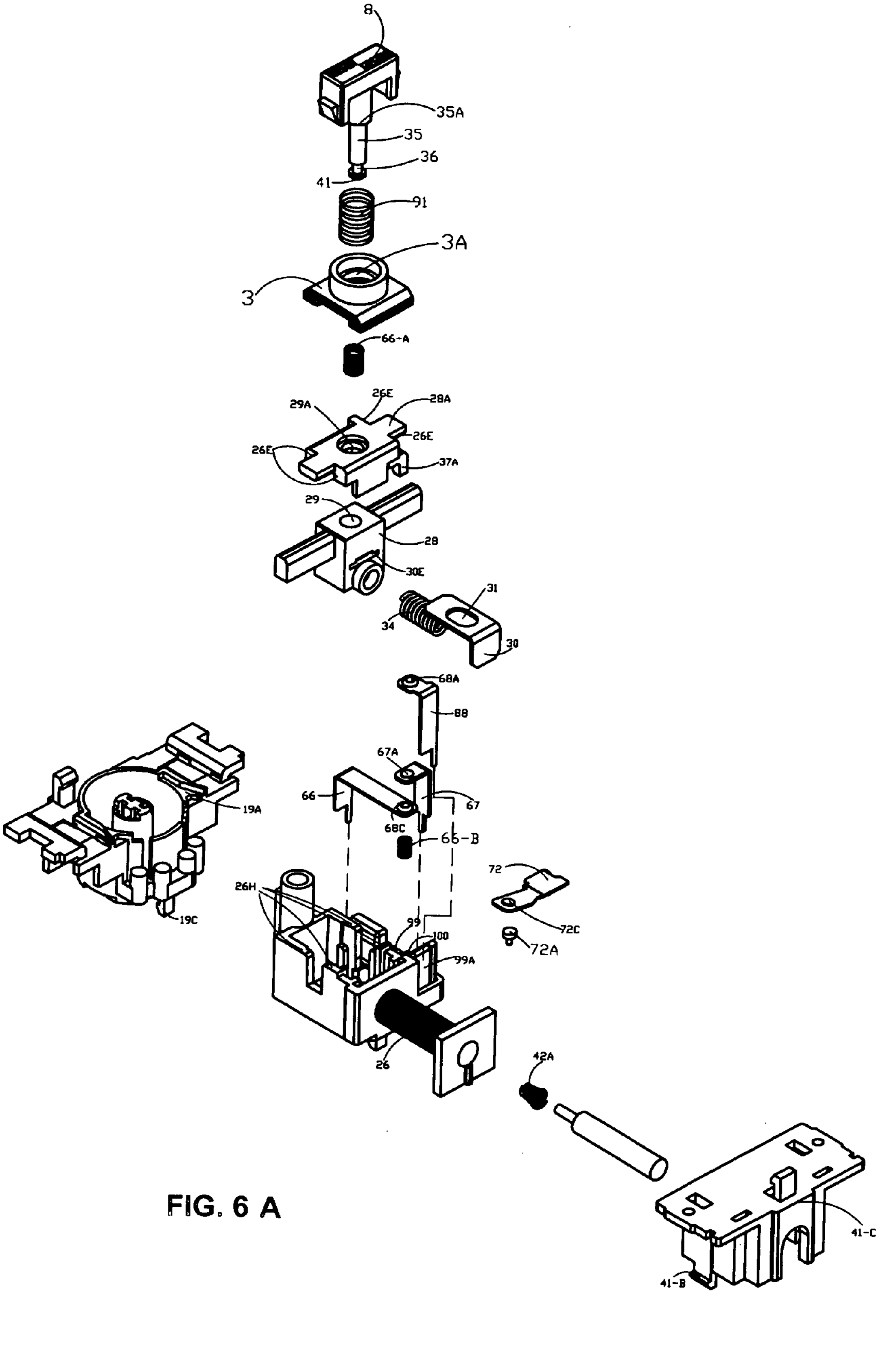
FIG. 6A and FIG. 6B are exploded cubic schematic of the structure of the model reset/tripping mechanical construction of the present invention.
Figure 8A:
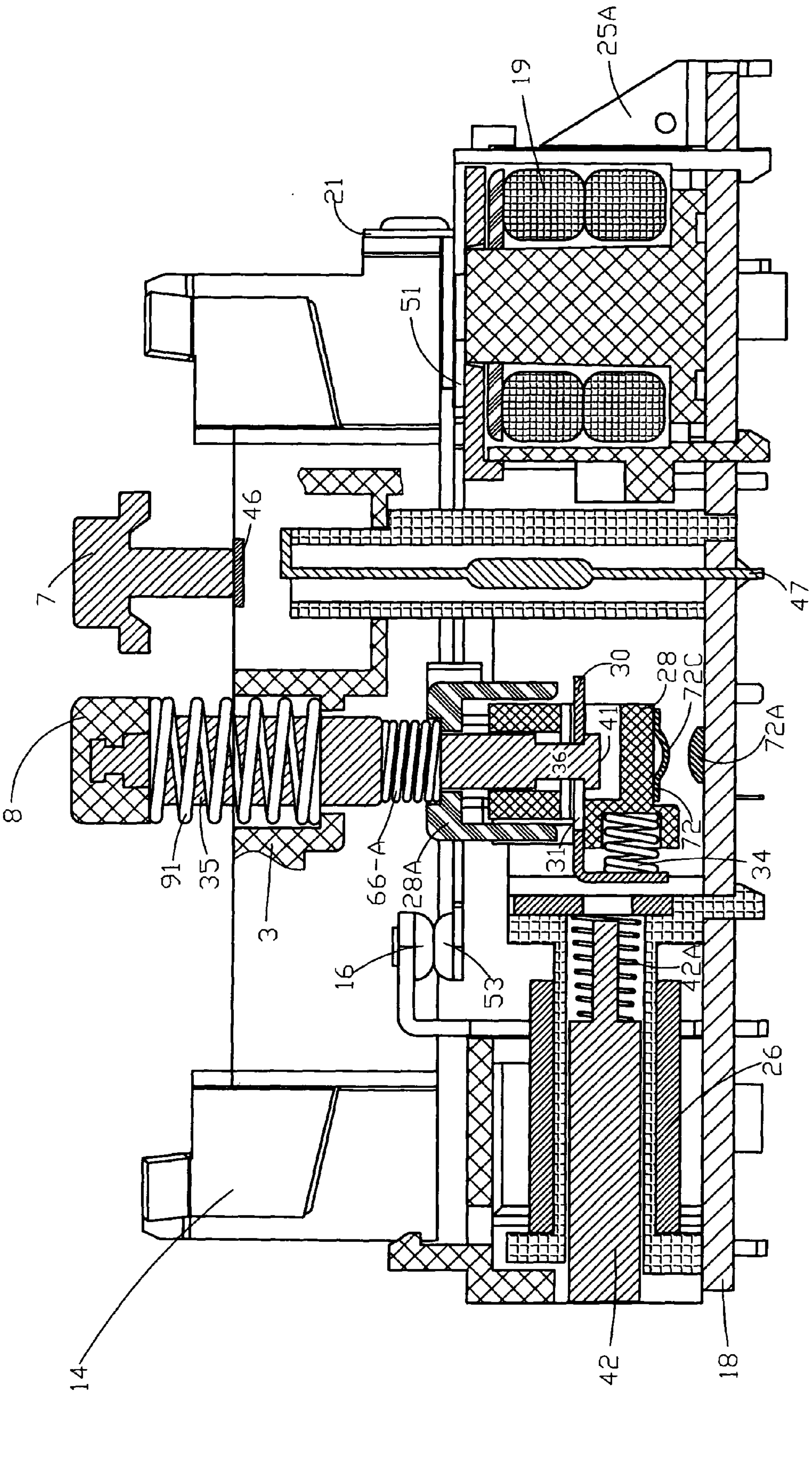
FIG. 8A is a partial cross-sectional view along the C-C line in FIG. 3. It is an illustration of the relationships among the parts after the reset button is depressed and released and the interrupter has power output.

In the middle of the reset support piece 28A, there is a vertical through hole 29A that allows directional lock 35 to be threaded through. In the middle of tripping mechanism 28, there is also a vertical through hole 29 to allow directional lock 35 to thread through. As shown in FIG. 7A, FIG. 8A, and FIG. 10A, reset directional lock 35, which is the pin underneath reset button 8, has two springs, i.e., reset spring 91 and quick trip spring 66-A slid onto it, can move up and down along the straight through hole 29A and central through hole 29 in the middle sections of reset support piece 28A and tripping mechanism 28. As shown in FIG. 6A, the dimension of the upper part of the directional lock 35 is larger than the dimension of the lower part. Step 35A is formed between the upper and lower parts of directional lock 35; reset spring 91 slides onto the upper part of directional lock 35 and is located between reset button 8 and insulated middle support 3; quick trip spring 66-A slides onto the lower part of directional lock 35 and is located between step 35A of directional lock 35 and reset support piece 28A. When the reset button is at a tripped state, reset support piece 28A is combined with tripping mechanism 28 due to pushed pressure from quick trip spring 66-A. Quick trip spring 66-A enables reset button 8 to be quickly and reliably released, causing movable contacts and fixed contacts to be quickly disconnected, thus greatly prolonging the life of the ground fault circuit interrupter.

A circular groove 36 is located near the bottom of reset directional lock 35. The bottom of reset directional lock 35 is a flat plane 41. When reset button 8 is at a tripped state, flat plane 41 of reset directional lock 35 and a through hole 31 in locking member 30 are in a misaligned position so that reset directional lock 35 cannot pass through locking member 30.

Tripping mechanism 28 has a through hole 30E in the middle section. Locking member 30 is a movable "L" shaped latch, preferably made of metal materials. It is inserted across the middle section of tripping mechanism 28 by through hole 30E. When reset button 8 is in a tripped state, blunt plane 41 of directional lock 35 is above locking member 30 and is in a staggered state with through hole 31 on top of locking member 30.

A locking member spring 34 is placed between the side wall of tripping mechanism 28 and the inside wall of locking member 30. A solenoid coil 26 with a built-in movable iron core 42 is placed on the outside wall of locking member 30. Built-in movable iron core 42 of solenoid coil 26 directly faces the side wall of locking member 30. When solenoid coil 26 is energized, the iron core moves inward and plunges upon the outside wall of locking member 30 to force locking member 30 to move horizontally, thus enabling flat plane 41 of directional lock 35 below reset button 8 to be aligned with through hole 31 and move downward to facilitate reset of the device or move upward to facilitate tripping of the device. Movable iron core 42 has a tower shaped spring 42A slid at the end portion of the iron core 42.

Figure 9A:
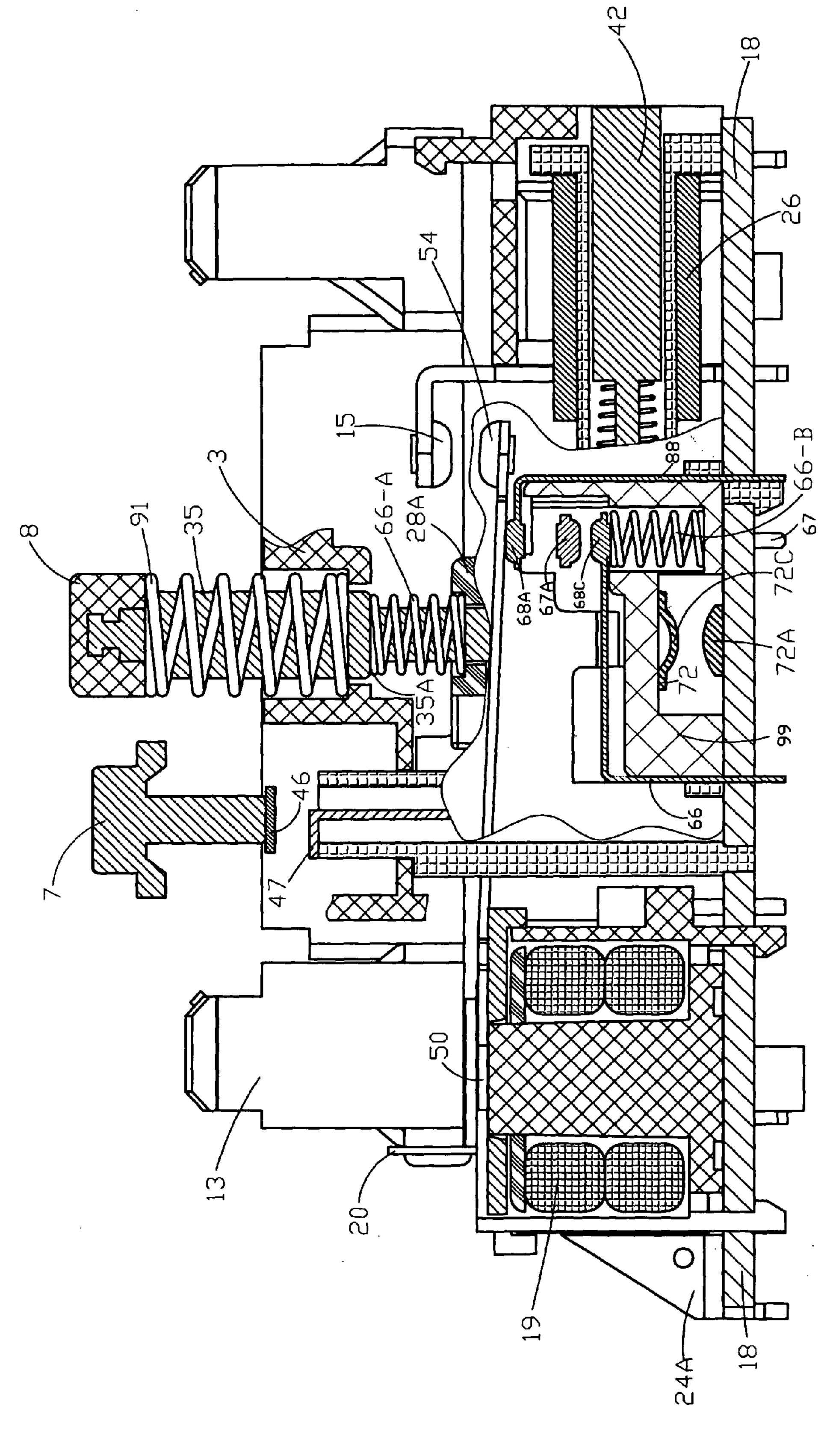
FIG. 9A illustrates the simulated leakage current generating metal piece assembly when the device is in a tripped state.

As shown in FIG. 6A and FIG. 9A, a simulated leakage current generating metal piece assembly is situated next to tripping mechanism 28. The simulated leakage current generating metal piece assembly comprises three triangularly arranged metal switch pieces, which are first metal switch piece 66, second metal switch piece 67 and simulated leakage current generating metal piece 88. The first metal switch piece 66 is located at the bottom. The simulated leakage current generating metal piece 88 is at the top. The second metal switch piece 67 is located in the middle. A spring 66-B is located below first metal switch piece 66. On the upper surface of first metal switch piece 66, a contact 68C is placed. On the lower surface of second metal switch piece 67, a contact 67A is placed. On the upper surface of simulated leakage current generating metal piece 88, a contact 68A is placed. One end of simulated leakage current generating metal piece 88 is located below neutral power input flexible metal piece 50, and the other end is connected to the hot power line through a simulated leakage current generating resistor R4 and solenoid coil L3. Alternatively, one end of simulated leakage current generating metal piece 88 can be placed below hot power input flexible metal piece 51. In that case, the other end of the simulated leakage current generating metal piece 88 should be connected to the neutral power line through the simulated leakage current generating resistor R4 and solenoid coil L3. Second metal switch piece 67 is located in the middle, with one end suspended below simulated leakage current generating metal piece 88 and the other end connected to the positive pole (i.e., the anode) of silicon controlled rectifier (SCR) V4. Second metal switch piece 67 is connected to the neutral power line through SCR V4. First metal switch piece 66 is located below second metal switch piece 67, with one end suspended below second metal switch piece 67 and the other end connected to the hot power line through the solenoid coil L3.

As shown in FIG. 9A, after the power input end of the ground fault circuit interrupter is properly connected to the power cable inside the wall and when reset button 8 is in a tripped state and the movable contacts of the ground fault circuit interrupter are disconnected from the fixed contacts, by pushing quick trip spring 66-A, contact 68A on the upper surface of simulated leakage current generating metal piece 88 comes into contact with neutral power input flexible metal piece 50, causing the power input end neutral power line to be connected to the hot power line through simulated leakage current generating metal piece 88, a simulated leakage current generating resistor and the solenoid coil, thus automatically generating a simulated leakage current and detecting whether the ground fault circuit interrupter has come to the end of its life.

As shown in FIG. 9A, when the GFCI is properly wired and is at a tripped state and the movable contacts are disconnected from the fixed contacts, the action of quick trip spring 66-A allows contact 68A on the upper surface of simulated leakage current generating metal piece 88 to be in contact with neutral power input flexible metal piece 50 to automatically generate a simulated leakage current, thus achieving the purpose of, without the need to operate any part, detecting whether the GFCI has come to the end of its service life.

Figure 9B:
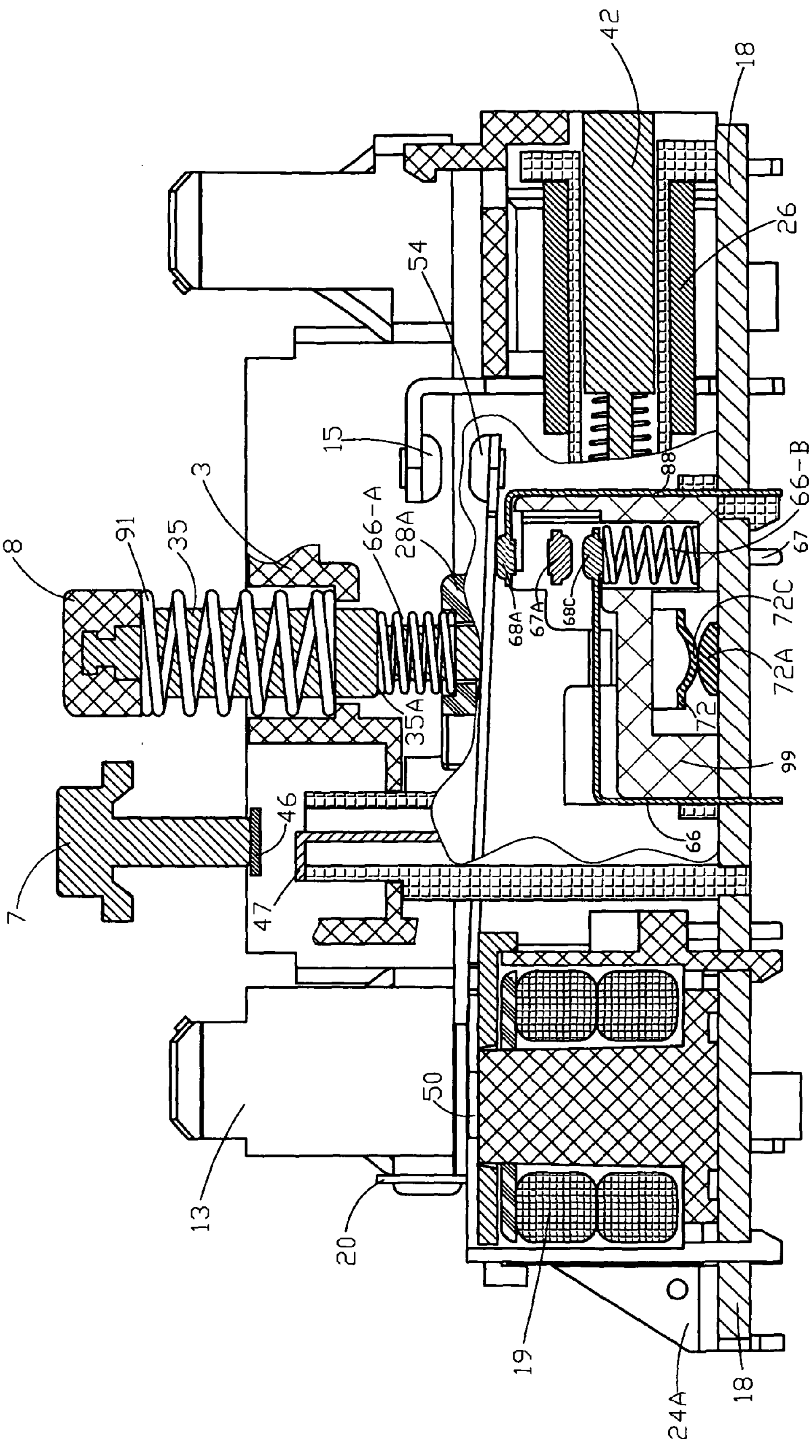
FIG. 9B illustrates the simulated leakage current generating metal piece assembly when the reset button is depressed.

If the GFCI has not come to the end of its service life, reset/tripping mechanical device can work normally, then the device can be reset. If the GFCI has come to the end of its service life, the reset/tripping mechanical device cannot work normally, thus preventing the reset button from being reset. As shown in FIG. 9B, when reset button 8 is pressed, contact

Figure 9C:
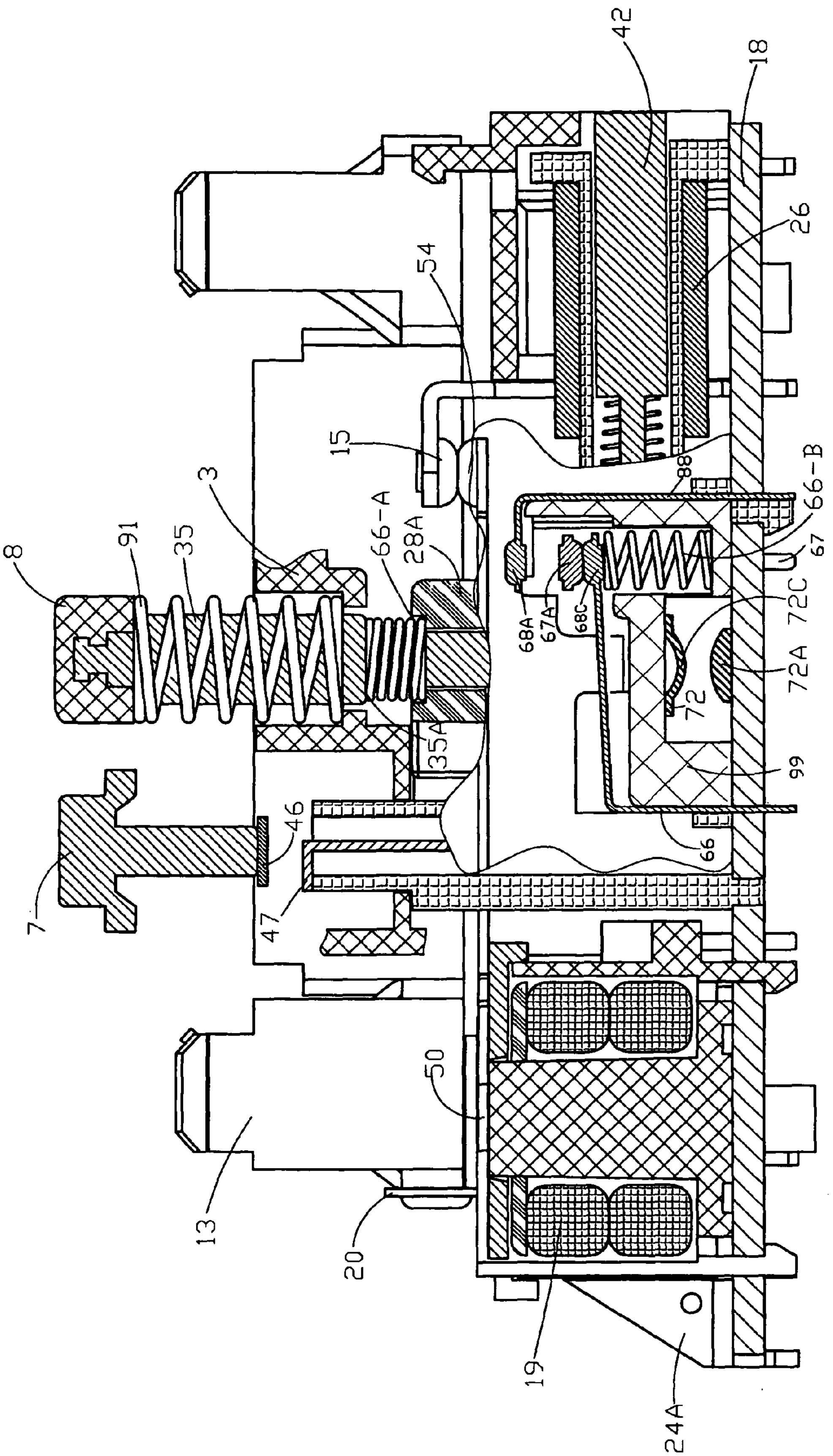
FIG. 9C illustrates the simulated leakage current generating metal piece assembly when the device has been reset.

68A on the upper surface of simulated leakage current generating metal piece 88 remains in contact with neutral power input flexible metal piece 50. When the reset button goes into a reset state from a static state, as shown in FIG. 9C, tripping mechanism 28 moves up and drives neutral power input flexible metal piece 50 to move up together with it, causing contact 68A on the upper surface of simulated leakage current generating metal piece 88 to be disconnected from neutral power input flexible metal piece 50 and causing the simulated leakage current to disappear. At the same time, under the action of spring 66-B, contact 68C on the upper surface of first metal switch piece 66 comes into contact with contact 67A on the lower surface of second metal switch piece 67 and the GFCI is in a leakage current detection and protection state.

Figure 10B:
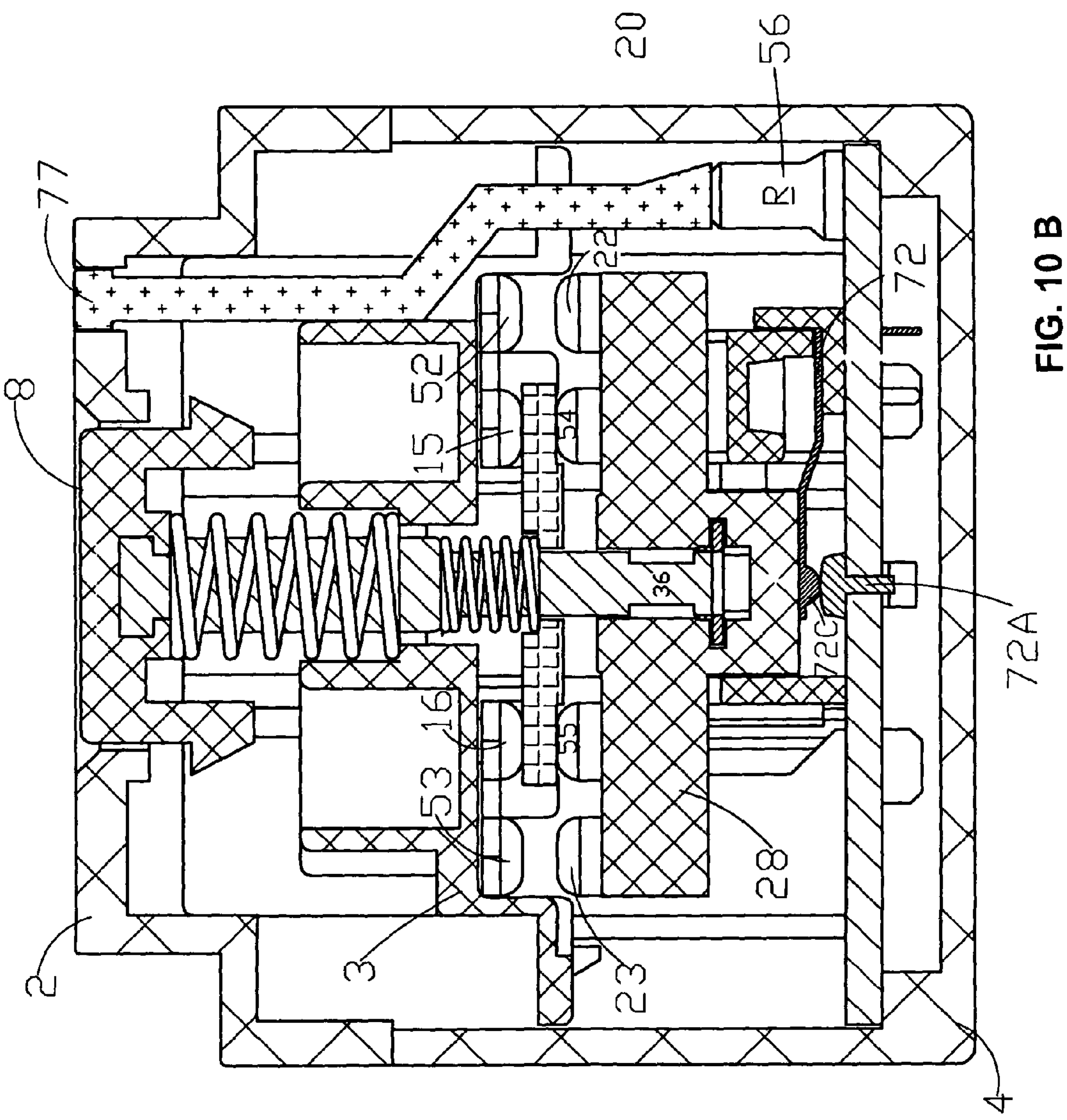
FIG. 10B is a partial cross-sectional view along the A-A line in FIG. 3. It is an illustration of the relationships among the parts the instant the reset button is depressed.
Figure 10C:
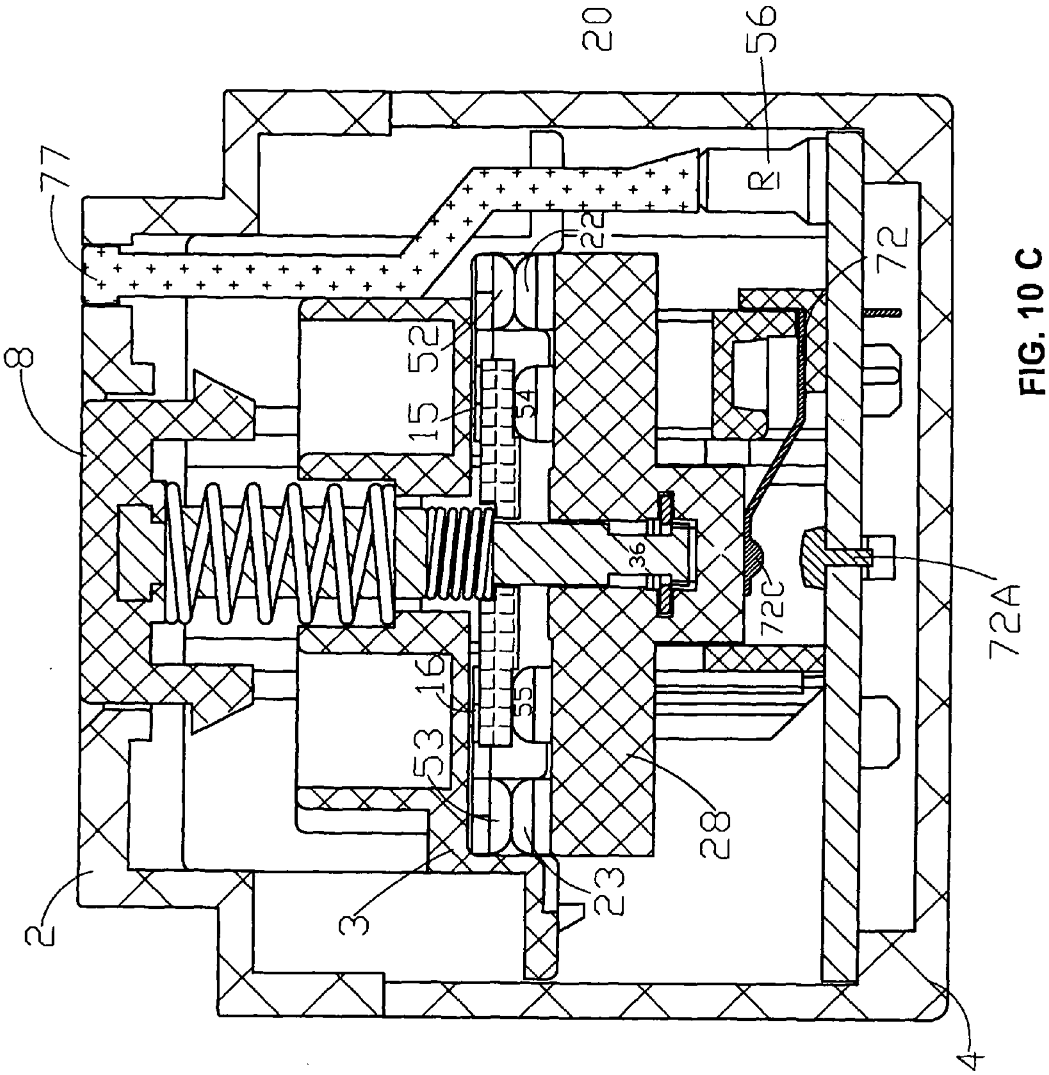
FIG. 10C is a partial cross-sectional view along the A-A line in FIG. 3. It is an illustration of the relationships among the parts after the device has been reset.

As shown in FIG. 6A and FIG. 10A, a reset start switch is located below tripping mechanism 28 and can be closed when reset button 8 is depressed. The reset start switch comprises flexible metal piece 72 and electric contact 72A. One end of flexible metal piece 72 is welded onto the circuit board and is connected to hot power line on the power input end through solenoid coil 26 (L3 in FIG. 11A and FIG. 11B); the other end is suspended in the air and above electric contact 72A. A contact 72C is on flexible metal piece 72 and is at a place directly above electric contact 72A. Electric contact 72A is welded onto the circuit board 18 and is connected to the positive pole (i.e., the anode) of SCR V4. When reset button 8 is at a tripped state as shown in FIG. 10A and when reset button 8 is in a reset state as shown in FIG. 10C, flexible metal piece 72 and electric contact 72A do not contact with each other. The reset start switch is in a nonconductive state. When reset button 8 is pressed down, as shown in FIG. 10B, tripping mechanism 28 presses down on flexible metal piece 72, causing contact 72C of flexible metal piece 72 and electric contact 72A to come into contact and become conducted. The reset start switch is closed. When reset button 8 is released, as shown in FIG. 10C, flexible metal piece 72 and electric contact 72A are disconnected, the reset start switch, which is coupled to reset button 8, is disconnected, thus reflecting the condition of reset button 8.

As shown in FIG. 6A, reset support piece 28A, tripping mechanism 28, locking member 30, locking member spring 34, reset button 8, simulated leakage current generating metal piece assembly 66, 67 and 88 as well as reset start switch, i.e., flexible metal piece 72 and electric contact 72A, are all shielded within solenoid framework 26K of the solenoid coil 26. There is a solenoid coil protection shield 41-C outside the coil of solenoid coil 26. On its left and right sides, there is respectively a hooked pin 41-B which is used to hook onto circuit board 18.

Reset directional lock 35 that forms the reset/tripping mechanical device, reset spring 91 and quick trip spring 66-A that slide onto reset directional lock 35, reset support piece 28A, the "T" shaped tripping mechanism 28 that is connected to reset button 8, locking member 30, locking member spring 34, the simulated leakage current generating metal piece assembly 66, 67 and 88 that is adapted to be connected to reset button 8 and tripping mechanism 28, the reset start switch, i.e., flexible metal piece 72 and contact 72A, and solenoid coil 26 are interconnected to form a freely movable body and support each other.

Figure 6B:
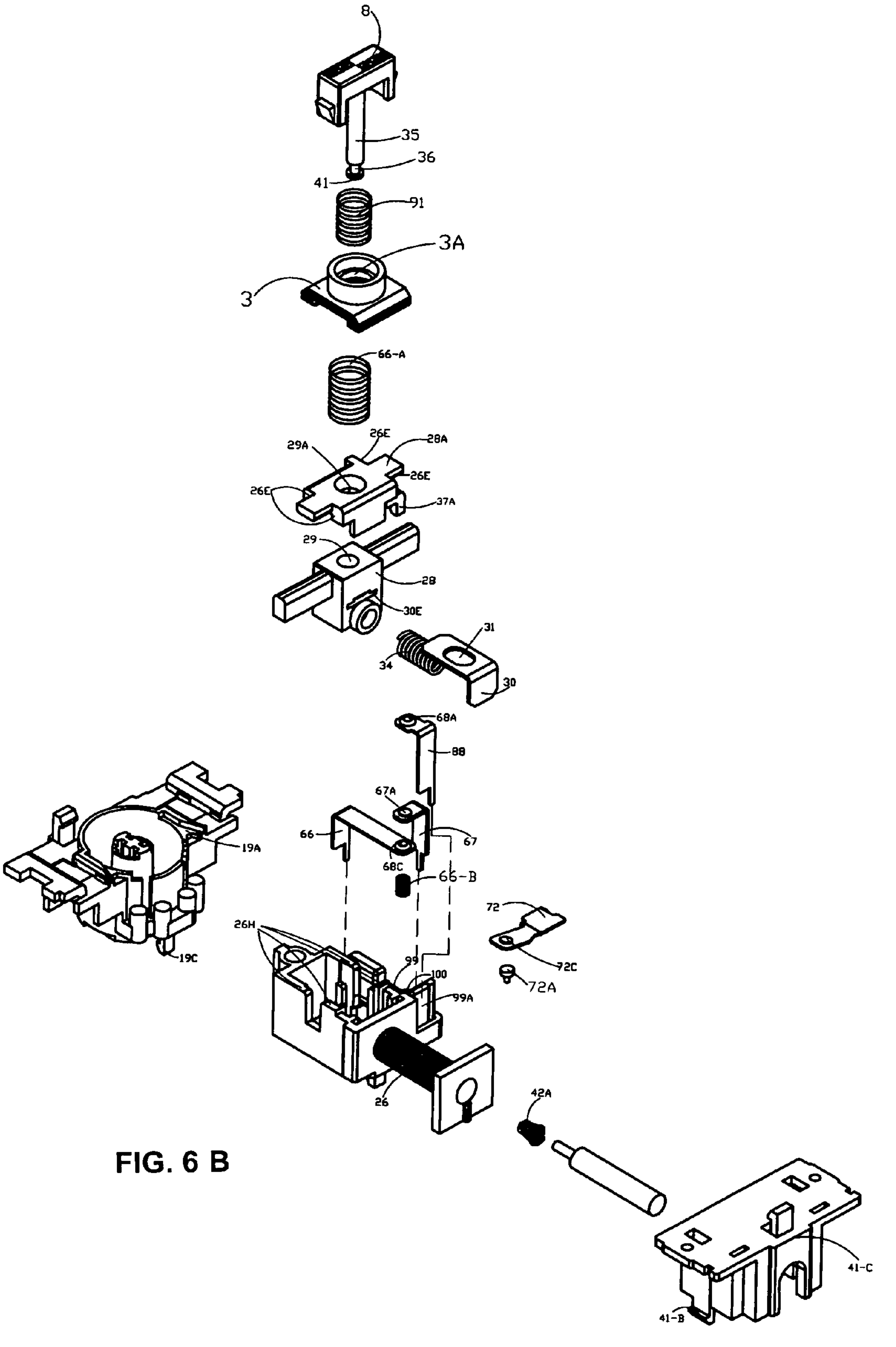

FIG. 6B is an exploded cubic view illustrating the structure of another type of reset/tripping mechanical device in the present invention. The difference between the reset/tripping mechanical device shown in FIG. 6B and the reset/tripping mechanical device shown in FIG. 6A is: the dimension of the upper part and lower part of reset directional lock 35 embedded below reset button 8 is the same; reset spring 91 slides onto the upper part of reset directional lock 35 and is located between reset button 8 and insulated middle support 3; quick trip spring 66-A slides onto the lower part of reset directional lock 35. The quick trip spring 66-A is located between insulated middle support 3 and reset support piece 28A.

As shown in FIG. 7A and FIG. 3, below test button 7 there are flexible metal piece 46 and metal piece 47 which contains a simulated leakage current generating resistor R3. A pressing of test button 7 cause flexible metal piece 46 to be in contact with metal piece 47 which manually generates a simulated leakage current. The flexible metal piece 46 and the metal piece 47 (resistor R3 in FIG. 11A and FIG. 11B) form test switch (KR-5) in FIG. 11A and FIG. 11B. One end of flexible metal piece 46 is connected to the hot line of the power output end LOAD of the ground fault circuit interrupter, while the other end is suspended in the air and below it, there is the metal piece 47 which contains the simulated leakage current generating resistor R3; one end of the metal piece 47 is suspended below flexible metal piece 46, while the other end is connected to the neutral line at the power input end. As shown in FIG. 7D, when test button 7 is depressed, flexible metal piece 46 comes into contact with metal piece 47 and manually generates a simulated leakage current. When test button 7 is released, flexible metal piece 46 is disconnected from the metal piece 47 and the simulated leakage current disappears.

FIG. 11A is the circuit diagram of the GFCI. As shown in the diagram, the control circuit mainly comprises differential transformers L1 (1000:1) and L2 (200:1) used for detecting an electric leakage current, control chip IC1 (RV4145), solenoid coil L3 (SOL) with a built in iron core, silicon controlled rectifier (SCR) V4, simulated leakage current generating metal piece assembly adapted to be interacted with reset button RESET, switches KR-2-1, KR-2-2, KR-3-1 and KR-3-2 serially connected in the power supply line, reset start switch coupled to reset button RESET, power output indicator LED1, simulated leakage current generating resistors R4 and R3 and some related diodes, resistor and capacitances, etc.

After the hot power line HOT and neutral power line WHITE on the power input line for the GFCI pass through differential transformers L1 and L2, they are connected to the hot power line HOT, neutral power line WHITE of the output end (load connecting end) LOAD of the GFCI through switches KR-2-1 and KR-2-2. At the same time, the hot power line HOT, neutral power line WHITE of the output end (load connecting end) LOAD of the GFCI is connected to hot power line HOT, neutral power line WHITE output conducting socket in the plug hole of the single phase, three line socket on the surface of the GFCI through another group of switches KR-3-1 and KR-3-2. Switches KR-2-1, KR-2-2, KR-3-1, and KR-3-2 are capable of moving up and down with the reset button RESET.

The leakage current detection signal output ends of differential transformers L1 and L2 are connected to signal input pins 1, 2, 3 and 7 of the control chip IC1. Control signal output pin 5 of the control chip IC1 is connected to the gate of silicon controlled rectifier (SCR) V4. Power input pin 6 of control chip IC1 is connected to hot power line HOT on the power input end LINE of the GFCI through diode V1, resistor R1 and solenoid coil L3. Ground pin 4 of control chip IC1 is connected to neutral power line WHITE on the power input end LINE of the GFCI.

The negative pole (i.e., the cathode) of silicon controlled rectifier (SCR) V4 is connected to neutral power line WHITE on the power input end LINE of the GFCI. The positive pole of silicon controlled rectifier (SCR) V4 is connected to the hot power line HOT on the power input end through reset start switch, i.e., flexible metal piece 72 and electric contact 72A, and solenoid coil 26 coupled to reset button RESET. At the same time, the positive pole of silicon controlled rectifier (SCR) V4 is also connected to first and second metal switch piece 67 and 66.

The iron core built-in solenoid coil L3 causes reset button RESET to reset or trip through the reset/tripping mechanical device inside the GFCI, thus causing switches KR-2-1, KR-2-2, KR-3-1 and KR-3-2 to move with reset button RESET so as to establish or discontinue electric continuity among the input end, the output load end, and the user accessible load end. The iron core built-in solenoid coil L3 further causes the simulated leakage current generating metal piece assembly to disconnect or close.

A power output indicator light LED1 is connected between power output end LOAD of the hot power line and the neutral power line of the GFCI. It is used to indicate whether the GFCI has power output. When the GFCI has power output, LED1 is lit; otherwise, LED1 is not lit. When the GFCI is in a tripped state, if the wiring of the GFCI is reverse, the LED1 indicator is lit, indicating a wiring error and the reset/tripping mechanism automatically prevents the reset button from being reset.

An automatic simulated leakage current is formed when the neutral line WHITE of the power input end which threads through different transformers L1 and L2 is connected to the hot line HOT of the power input end through contact 68A on simulated leakage current generating metal piece 88, simulated leakage current generating resistor R4, and solenoid coil L3 (SOL). After the power input end LINE of the GFCI is properly connected to the power line inside the wall and the device is in a tripped state and reset button RESET is not pressed, since contact 68A is in closed contact with neutral power input flexible metal piece 50, it directly connects hot power line HOT and neutral power line WHITE on the power input, automatically generating a simulated leakage current. Therefore, after the power input end of the GFCI is properly connected with the power line inside the wall, a simulated leakage current can be automatically generated without operating any part. When the leakage current protection circuit works normally, after the leakage current is detected, pressing of the reset button RESET can reset the GFCI. With releasing of the reset button, the closed contact 68A on simulated leakage current generating metal piece 88 is disconnected with neutral power input flexible metal piece 50 through the reset/tripping mechanical device, and the constantly open contacts 67A on second metal switch piece 67 and 68C on first metal switch piece 66 closes, and therefore the simulated leakage current disappears and reset button RESET can be depressed to reset the device.

As shown in FIG. 11A, after the GFCI is properly wired to the wall and the reset button has not been reset, one end of the simulated leakage current generating metal piece is in contact with the neutral input flexible metal piece which is electrically connected to the neutral power line WHITE, the other end of the simulated leakage current generating metal piece is in series with a simulated leakage current generating resistor R4, which generates a simulated current, which passes through solenoid coil 26 to be connected to hot power line HOT. The simulated current then passes through differential transformers L1 and L2 to be detected as a simulated leakage current. The simulated leakage current flows through differential transformers L1 and L2 which outputs a signal to the leakage current detection IC chip (IC1). Pin 5 of the control chip IC1 outputs a high potential control signal, i.e., a simulated leakage current signal, to the gate of silicon controlled rectifier (SCR) V4 to trigger SCR. If the differential transformers L1 and L2, the leakage current detection IC chip (IC1), the SCR, and the solenoid coil are working properly, the positive pole and the negative pole of the SCR become conductive. When the reset button RESET is pressed, a large current flows through solenoid coil L3. Solenoid coil L3 generates a magnetic field to move its iron core into the solenoid coil and causes reset button RESET to act through the reset/tripping mechanical device. The GFCI is reset, while at the same time, the simulated leakage current generating metal piece is detached from the input flexible metal piece; and the simulated leakage current disappears.

By contrast, if the leakage current protection circuit is not working properly and the GFCI has come to the end of its service life, then SCR V4 is not conducting so that no large current will flow through solenoid coil L3. As a result, no magnetic field is generated, and the built-in iron core within the solenoid coil does not act, so that the reset/tripping mechanical device does not act and the reset button cannot be reset. The reset indicator, i.e., power output indicator LED1, is not lit, thus reminding the user that the GFCI has come to the end of its life and a good replacement the ground fault circuit interrupter is required.

Figure 7B:
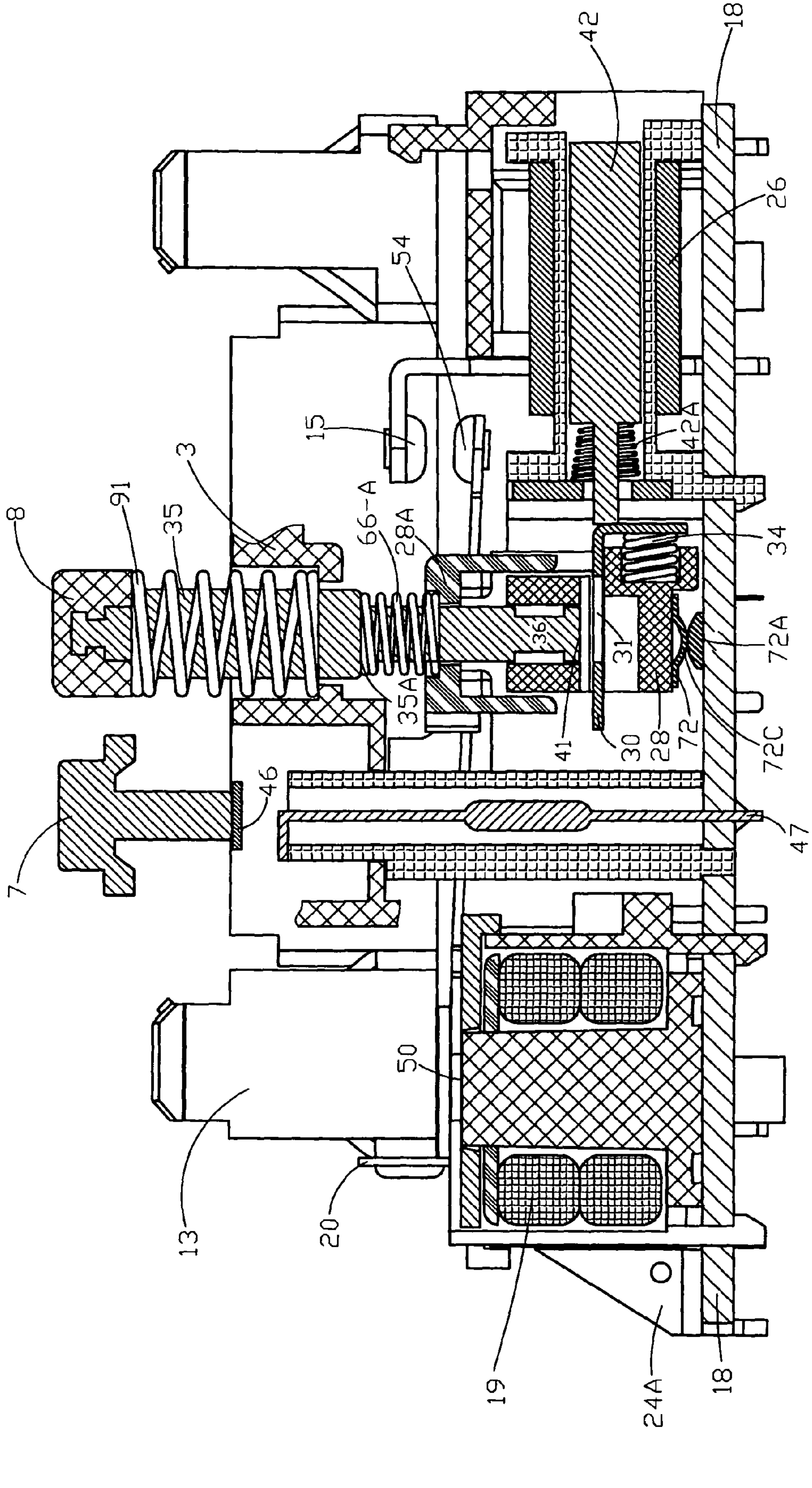
FIG. 7B is a partial cross-sectional view along the B-B line in FIG. 3. It is an illustration of the relationships among the parts when the reset button is depressed.
Figure 7C:
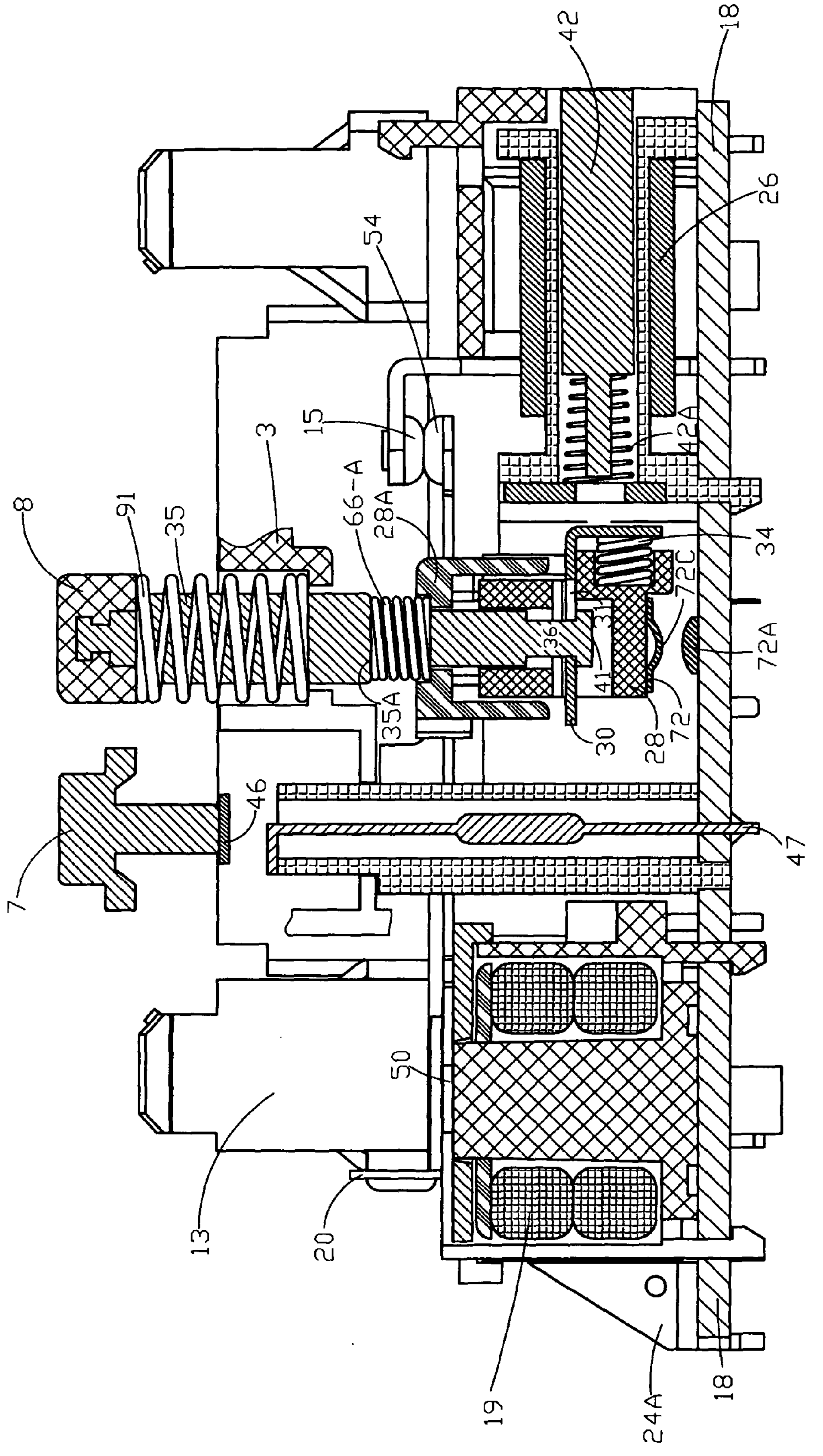
FIG. 7C is a partial cross-sectional view along the B-B line in FIG. 3. It is an illustration of the relationships among the parts after the device has been reset and the GFCI works normally and has power output.
Figure 7D:
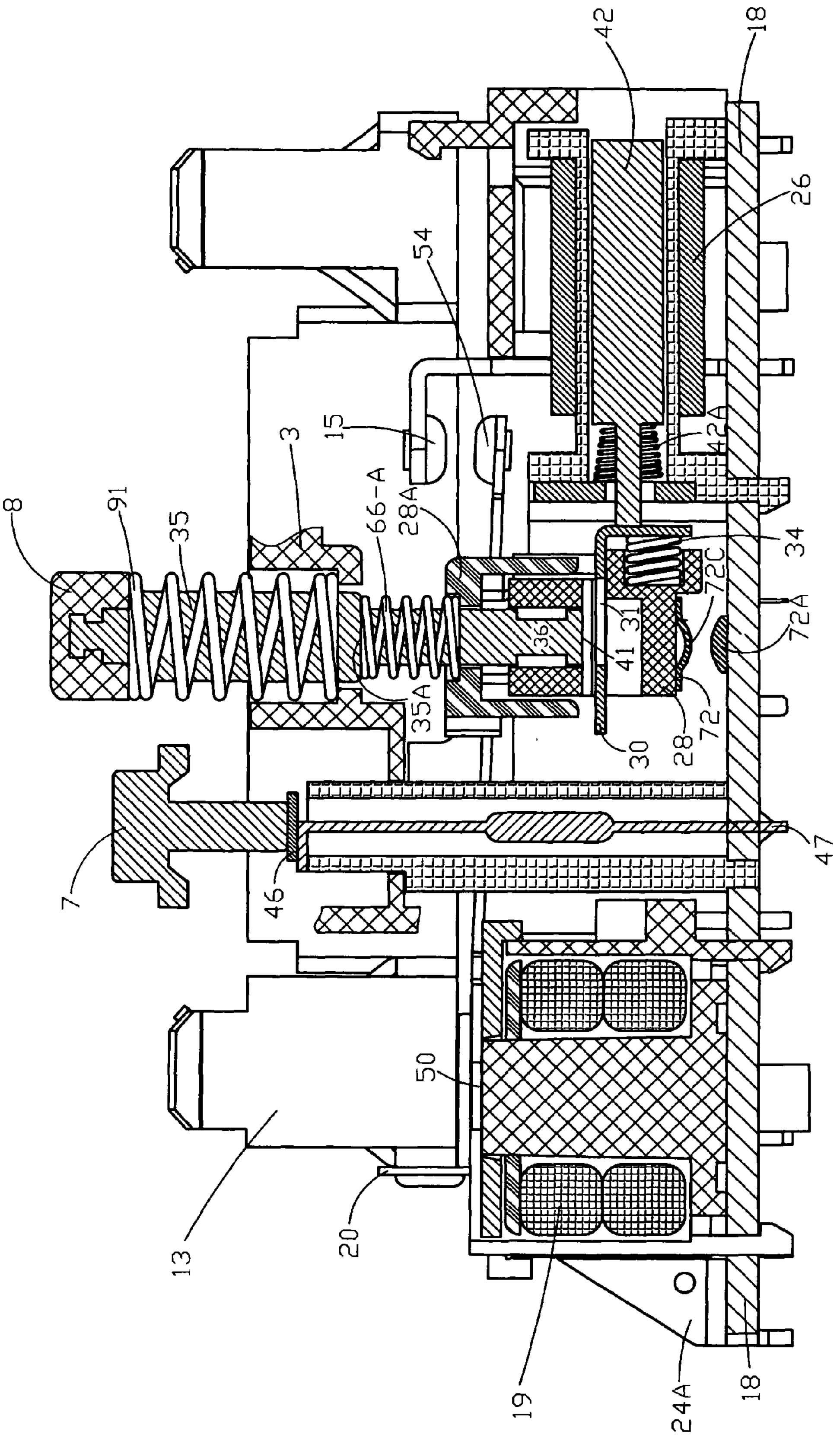
FIG. 7D is a partial cross-sectional view along the B-B line in FIG. 3. It is an illustration of the relationships among the parts when the test button is depressed to cut off power output to the load and user accessible load of the GFCI.

As shown in FIG. 7B and FIG. 9B, when reset button RESET is depressed and all of the key components in the device are working properly, when constantly closed contact 68A on the simulated leakage current metal piece and neutral power input flexible metal piece 50 are not yet disconnected, the reset start switch, i.e., flexible metal piece 72 and electric contact 72A, is closed due to the depression of reset button RESET. At this time, since the closure of the reset start switch causes point A and point B to have a short connection, the original voltage on point A and point B is applied to solenoid coil (SOL) L3, causing a certain current to flow through the solenoid coil to generate a magnetic field. The iron core inside the solenoid coil is engaged in an impact movement. Through the reset/tripping mechanical device, the reset button can be reset, as shown in FIG. 7C and FIG. 8A. The power outlet has power output and power output indicator LED1 is lit. At the same time, as shown in FIG. 9C, due to the action of reset button RESET, contact 68A of the simulated leakage current metal piece and the neutral power input flexible metal piece 50 are disconnected. Constantly open contacts 68C and 67A on the first metal piece and second metal piece, respectively, are closed, and the simulated leakage current disappears. After reset button RESET is reset, switch KR-2-1, KR-2-2, KR-3-1 and KR-3-2 coupled thereto are closed, the GFCI has power output and power output indicator LED1 is lit, indicating that both the single phase, three line socket on the surface of the interrupter and LOAD output end have power output.

Figure 8B:
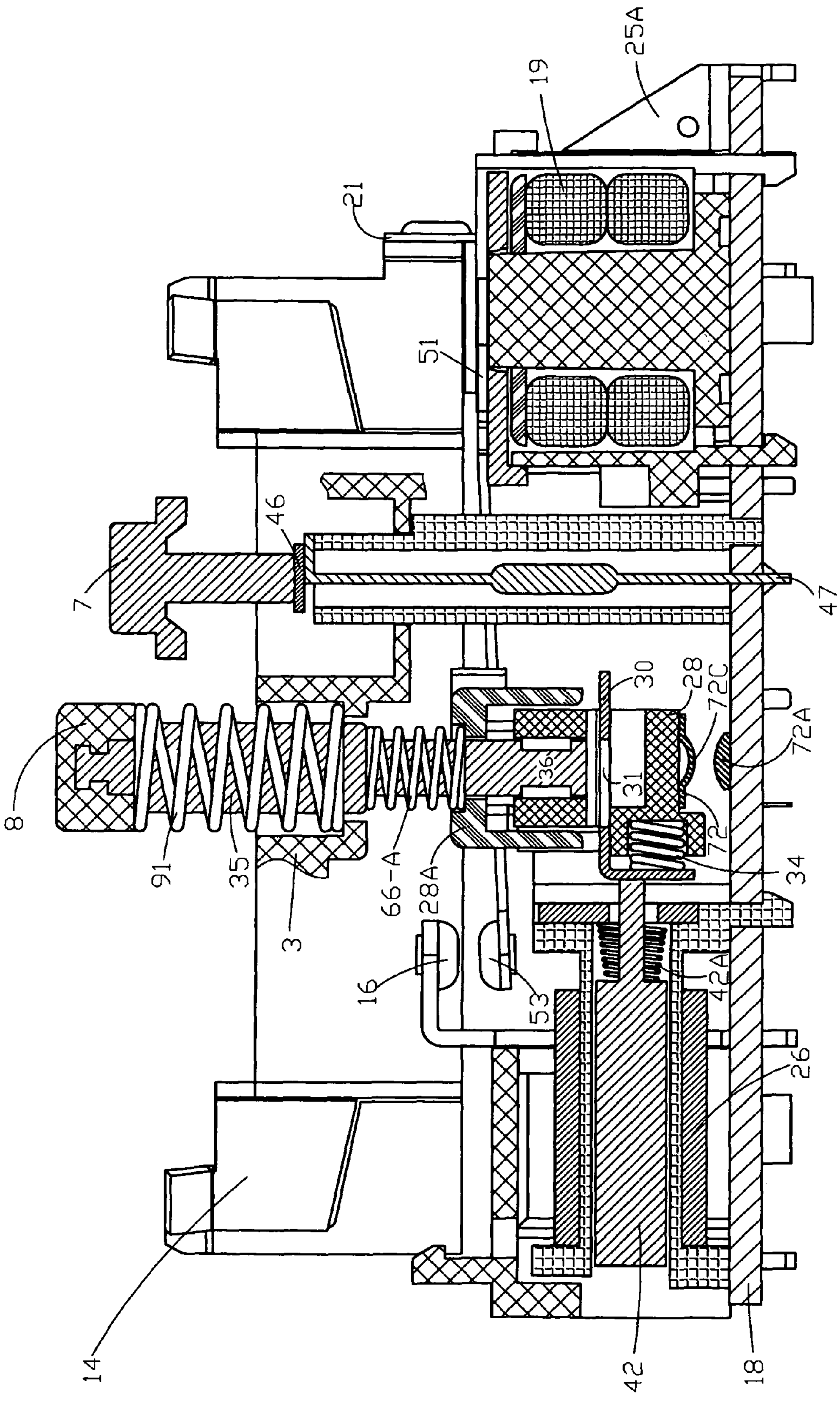
FIG. 8B is a partial cross-sectional view along the C-C line in FIG. 3. It is an illustration of the relationships among the parts when the device is tripped and the GFCI has no power output.

When the functions of the GFCI are intact, after the GFCI is powered and the reset button RESET is depressed, load end LOAD and the user accessible load end of the GFCI have power output and the GFCI works normally, and the device is reset. If at this time, a leakage current is detected, due to the fact that hot power line HOT and neutral power line WHITE both pass through the differential transformers L1 (1000:1) and L2 (200:1), because the currents from the two power lines, respectively, that passes through differential transformers L1 and L2 are not the same, differential transformers L1 and L2 immediately sent a voltage signal with a certain value to the control IC1. A control signal is output from pin 5 of the IC1 to the gate of SCR V4. SCR V4 is triggered and the positive pole and the negative pole become conducted. The two ends of solenoid coil L3 will receive a voltage of a certain value. A certain amount of electric current flows through the solenoid coil L3 and generates a magnetic field. The iron core within the solenoid coil is engaged in an impact movement, causing reset button RESET to trip through the reset/tripping mechanical device and power output to be cut off. As shown in FIG. 8B, the fixed and movable contacts inside the power outlet are disconnected and power output indicator LED1 goes out.

When a test needs to be performed to determine whether the GFCI functions normally, as shown in FIG. 7D, test button TEST can be pressed, to cause test switch coupled to the test button to be closed, thus generating a simulated leakage current to test the components of the GFCI. If the leakage current protection circuit does not work normally and the GFCI has come to the end of its life, reset button RESET cannot be reset.

FIG. 11B illustrates exemplary detailed circuitry on the control circuit board of the GFCI of the present invention that regularly tests whether the GFCI has come to the end of its life. The difference between the control circuit from the control circuit shown in FIG. 11A is: a timer chip IC2 is added to the control circuit of FIG. 11B. Control signal output end 2 of timer chip IC2 is connected to the gate of SCR V4 and periodically outputs a control signal to enable SCR V4 to become conducted, causing the interrupter to be tripped. After tripping, the GFCI performs a self test and waits for a reset by the user, thus regularly testing whether the GFCI still has protective functions against leakage current, that is, whether it has come to the end of its life. When the GFCI works normally, key components forming the leakage current detection and protection circuit, such as SCR V4, solenoid coil L3, differential transformers L1 and L2 and control circuit IC1 are intact. SCR V4 is also intact and can be conducted normally, and the reset button can be reset, indicating that the GFCI has protective functions against leakage current. Otherwise, when the leakage protection circuit cannot work normally, for example, when one of the components forming the leakage current detection and protection circuit, such as SCR V4, solenoid coil L3, differential transformers L1 and L2 or control circuit IC1, fails, the GFCI loses its protective functions against leakage current. The leakage protection circuit cannot form a loop and the reset button cannot reset, indicating that the leakage protection circuit has come to the end of its life, and reminding the user that the GFCI needs to be replaced.

As shown in FIG. 10A, a power output indicator is placed on control circuit board 18. A vertically placed light guide tube 77 is placed on the power output indicator. Light guide tube 77 threads through hole D on insulated middle support 3 (as shown in FIG. 3). The top of light guide tube 77 is located below indicator hole 30-A on the surface of upper cover 2.

To improve the life of the GFCI and avoid any damage to the GFCI caused by instantaneous high voltage such as lightning or as a result of any other cause, as shown in FIG. 7A, FIG. 8A, and FIG. 5, the present invention provides discharge metal pieces 25A and 24A, which are shaped as right triangles and extended from the ends of the power input connecting pieces 25 and 24 that connect the GFCI with hot power line and neutral power line input wiring screws 10 and 9. The tips of the two metal pieces are placed opposite to each other and keep a certain distance from each other.

In addition, hot power line HOT of the power input end passes through solenoid coil SOL and a metal oxide varistor MOV to be connected to neutral power line WHITE on the power input end.

When an instantaneous high voltage caused by lightning or any other cause acts on the GFCI, the air media between the tip of the discharge metal piece, which is connected to the hot power line on the input end, and the tip of discharge metal piece, which is connected to the neutral power line on the input end, is broken down, causing the air to discharge. Most of the high voltage is consumed through the discharging metal pieces, and the small remaining part is consumed through solenoid coil SOL and the metal oxide varistor MOV, thus protecting the GFCI from being damaged by high voltage.

If the metal oxide varistor MOV used in the GFCI is a surge suppressing MOV, it has the capability of preventing electrophoresis.

As shown in FIG. 11A and FIG. 11B, the GFCI of the present invention is also capable of preventing reverse wiring errors. As shown in the figures, the load output end LOAD of the GFCI is connected to the single phase, three line output socket on the surface of the GFCI through switches KR-3-1 and KR-3-2 coupled to reset button RESET; hot power line and neutral power line on the input end the GFCI are connected to the hot power line and neutral power line of the load output end LOAD through switches KR-2-1 and KR-2-2. Therefore, when an installer erroneously connects the power line inside a wall to the load output end LOAD of a GFCI, the present invention will automatically prevent reset because no simulated leakage current can be generated through the simulated leakage current generation circuit (comprising the simulated leakage current generating metal piece, the neutral power input flexible metal piece, resistor R4 and solenoid coil SOL). Leakage current detection IC chip IC1 cannot output any simulated leakage current signal. SCR V4 is not conducted. No current flows through solenoid coil SOL, thus no magnetic field is generated to push the built-in iron core to act. The reset/tripping mechanical device does not act, thus automatically preventing the reset button from being reset. Because switches KR-2-1, KR-2-2, KR-3-1 and KR-3-2 are coupled to reset button RESET, the non-movement of the reset button causes switches KR-2-1, KR-2-2, KR-3-1 and KR-3-2 to stay opened. Neither the input end LINE nor the power socket on the surface of the GFCI has power output. Reset indicator LED1 is lit, indicating a wiring error. It is only after the installer properly connects the wire then reset button can be reset and the GFCI has power output.

In conclusion, the GFCI disclosed in the present invention has the following outstanding advantages:

(1) The GFCI has a prolonged service life:

The present invention uses a quick trip spring 66-A slid onto directional lock 35. When the reset button is at a tripped state, quick trip spring 66-A pushes reset support piece 28A, allowing touch pin 37A of reset support piece 28A to extend downward to steadily press onto the neutral power input flexible metal piece 50, thus causing contact 68A on simulated leakage current generating metal piece 88 to be in steady and reliable contact with neutral power input flexible metal piece 50 to generate a simulated leakage current to test the device. After the GFCI is reset, the quick trip spring 66-A is in a compressed state. When the device is tripped, either due to ground fault or a depression of the test button, the quick trip spring 66-A is released, thus assisting movable contacts 55 and 54 on input flexible metal pieces 51 and 50 to be quickly detached from fixed contacts 16 and 15 on power output terminal metal pieces 81 and 80 and movable contacts 23 and 22 on user accessible load flexible metal pieces 21 and 20 to be quickly detached from fixed contacts 53 and 53 on power output terminal metal pieces 81 and 80. This guarantees minimal detachment time, thus reducing the arc generated by the detachment of movable and fixed contacts, and prolonging the life of the movable and fixed contacts and prolonging the life of the GFCI.

(2) The GFCI has high voltage surge protection function: The GFCI of the present invention contains a pair of input power connecting pieces which has a pair of discharge metal pieces. During a high voltage surge, such as lightning, the discharge metal pieces of said input power connecting pieces cause a discharge of electricity through the tips of the discharge metal pieces to protect the GFCI from being damaged due to the high voltage surge.

(3) The GFCI has superior testing capability: After the power input end of the GFCI is properly connected to the power line within the wall, without operating of any part, a simulated leakage current can be automatically generated to detect whether the GFCI has protective functions against the leakage current, i.e., whether or not it has come to the end of its life by displaying the test result.

a. When the components of the GFCI are working properly and the leakage current protection circuit has not come to the end of its life, a correct reset mechanism can be set up so that the GFCI can be reset. After the reset, power output indicator is lit, indicating that the GFCI can work normally;

b. When one or more of the components (such as the differential transformers, the leakage current detection IC chip, the SCR, and/or the solenoid coil) in the leakage current protection circuit are no longer functioning, i.e., the leakage current protection circuit has come to the end of its life, the reset button is automatically prevented from being reset. Neither the load output end nor the power socket on the surface of the GFCI has power output. Power output indicator is not lit.

Therefore, the user can conclude whether the GFCI has come to the end of its life and its work status by pressing the reset button.

(4) A timer chip: a timer chip is added to the control circuit to regularly test whether the GFCI has come to the end of its life.

(5) Manual end-of-life detection function: The GFCI has manual end-of-life detect function through the depression of the test button which will generate a simulated leakage current to detect the components of the GFCI. The key components that can be detected by the simulated leakage current include, but are not limited to, the solenoid coil, the differential transformer, the leakage current detection IC chip, and the SCR.

(6) The GFCI has reverse wiring protection: When an installer or electrician erroneously connects the power line inside a wall to the power output end of the GFCI, the present invention does not allow reset because no simulated leakage current can be generated. The leakage current detection IC chip IC1 cannot generate a control signal. SCR V4 does not become conductive. No current flows through solenoid coil L3. No magnetic field can be generated to push its built in iron core to act. The reset/trip mechanical device cannot act, so as to prevent the reset button from being reset. The interrupter has no power output. The power output indicator is lit, indicating a wiring error. It is only after the installer properly connects the wire that the reset button can be reset, the power output end of the GFCI has power output and power output indicator can be lit.

While the GFCI of the present invention has been described in connection with an exemplary embodiment, those skilled in the art will understand that many modifications in light of these teachings are possible, and this application is intended to cover variations thereof. Therefore, the scope of the appended claims should be accorded the broadest interpretation so as to encompass all such modifications.

What is claimed is:

1. A circuit interrupting device having a pair of line terminals, a pair of load terminals, and a pair of user accessible load terminals, which are electrically separated from each other in a tripped state and electrically connected in a reset state; wherein said circuit interrupting device further comprises:

a reset directional lock coupled to a reset button; and a circuit interrupting assembly capable of establishing or disengaging electrical continuity within said circuit interrupting device, wherein said reset directional lock comprises an upper portion, a lower portion and a step, wherein the step forms a dimensional difference between the upper portion and the lower portion, wherein said reset directional lock further comprises a reset spring and a quick trip spring, both sliding onto said reset directional lock, wherein said reset spring is located at said upper portion of said reset directional lock and said quick trip spring is located at said lower portion of said reset directional lock and the quick trip spring urges upward against the step between said upper portion and said lower portion, and wherein said reset spring and said quick trip spring are configured to selectively urge said circuit interrupting assembly between a circuit making position and a circuit breaking position to selectively establish or disengage electrical continuity.

2. The circuit interrupting device according to claim 1, wherein said reset spring and said quick trip spring are separated by an insulated middle support.

3. The circuit interrupting device according to claim 1, wherein said reset directional lock is tubular and is larger in diameter in said upper portion than in said lower portion.

4. The circuit interrupting device according to claim 1, wherein said reset spring and said quick trip spring are coil springs.

5. The circuit interrupting device according to claim 1, wherein said quick trip spring is in a compressed condition when said circuit interrupting device is in said reset state, which causes said circuit interrupting assembly to quickly move toward said circuit breaking position when there is a fault.

6. The circuit interrupting device according to claim 1, wherein said circuit interrupting assembly comprises:

a pair of input flexible metal pieces, each having a respective end electrically connected to a respective one of said pair of line terminals, and each having another end containing a movable contact;

a pair of user accessible load flexible metal pieces, each having a respective end electrically connected to a respective one of said pair of user accessible load terminals, and each having another end containing a movable contact; and a pair of fixed contacts on each of said pair of said load terminals, wherein respective movable contacts on each of said pair of said input flexible metal pieces mates with a respective one of said pair of said fixed contacts on each of said pair of said load terminals and respective movable contact on each of said pair of said user accessible load flexible metal pieces mates with a respective other of said pair of said fixed contacts on each of said pair of said load terminals to establish said electrical continuity.

7. The circuit interrupting device according to claim 1, further comprising a tripping mechanism and a reset support piece which is rested on top of said tripping mechanism, wherein said reset support piece and said tripping mechanism each contain respective through holes which are aligned with each other to allow said reset directional lock to pass through.

8. The circuit interrupting device according to claim 1, wherein said reset directional lock has a flat bottom surface.

9. The circuit interrupting device according to claim 7, further comprising a locking member extended into said tripping mechanism, said locking member having a through hole which is partially aligned with said through hole in said tripping mechanism when in said tripped state, and the locking member having a through hole that is fully aligned with said through hole in said tripping mechanism when said circuit interrupting device is in the process of resetting.

10. The circuit interrupting device according to claim 1, further comprising a simulated leakage current generating assembly comprising:

a simulated leakage current generating metal piece, a first metal switch piece, and a second metal switch piece, wherein said simulated leakage current generating metal piece, said first metal switch piece, and said second metal switch piece are arranged with respective first ends at vertices of a triangle and with respective second ends vertically stacked so that said first metal switch piece is located at a bottom, said second metal switch piece is located in a middle, and said simulated leakage current generating metal piece is located at a top, wherein said simulated leakage current generating assembly is electrically connected to one of said pair of line terminals, and wherein said simulated leakage current generating assembly generates a simulated leakage current to automatically conduct an end-of-life test when the circuit interrupting device is properly wired to an AC power source.

11. The circuit interrupting device according to claim 10, further comprising a reset start switch which is closed only upon a depression of said reset button, wherein when said circuit interrupting device is properly wired and in said tripped state, and when said circuit interrupting device has passed said end-of-life test, said closing of said reset start switch enables said circuit interrupting device to be reset.

12. The circuit interrupting device according to claim 1, further comprising a timer chip which periodically outputs a control signal to cause said circuit interrupting device to trip.

13. The circuit interrupting device according to claim 1, further comprising a power discharge mechanism, wherein during a high voltage surge said power discharge mechanism protects said circuit interrupting device from being damaged due to said high voltage surge.

14. The circuit interrupting device according to claim 1, further comprising a test button, wherein a depression of said test button generates a simulated leakage current to conduct a manual end-of-life test of said circuit interrupting device.

15. The circuit interrupting device according to claim 1, wherein said circuit interrupting device is a ground fault circuit interrupter.

16. The circuit interrupting device according to claim 6, wherein said respective movable contacts on each of said pair of said input flexible metal pieces disengages from respective ones of said pair of said fixed contacts on each of said pair of said load terminals and respective movable contacts on each of said pair of said user accessible load flexible metal pieces disengages from respective others of said pair of said fixed contacts on each of said pair of said load terminals to break said electrical continuity in said tripped state.

17. The circuit interrupting device according to claim 16, wherein each of said end of said pair of input flexible metal piece is adapted to pass through a differential transformer to be welded to a circuit board.

18. The circuit interrupting device according to claim 16, further comprising a tripping mechanism having a pair of lifting arms extended outward, wherein said pair of input flexible metal pieces and said pair of user accessible load flexible metal pieces of said circuit interrupting assembly rest on said pair of lifting arms of said tripping mechanism, and whereby said tripping mechanism is selectively movable to urge said pair of input flexible metal pieces and said pair of user accessible load flexible metal pieces of said circuit interrupting assembly to move upward or downward to mate with or disengage from said pair of fixed contacts on each of said pair of said load terminals to establish or break electrical continuity in said circuit interrupting device.

19. The circuit interrupting device according to claim 18, further comprising a reset support piece resting on top of said tripping mechanism, wherein both said reset support piece and said tripping mechanism contain respective holes aligned with each other to receive said reset directional lock which is coupled to said reset button.

20. The circuit interrupting device according to claim 19, wherein said pair of said input flexible metal pieces is rested between said reset support piece and said tripping mechanism.

21. The circuit interrupting device according to claim 10, wherein said simulated leakage current generating metal piece comprises a contact which is in contact with one of said pair of said input flexible metal pieces when said circuit interrupting device is in said tripped state, and wherein when said circuit interrupting device is properly wired and in said tripped state, said simulated leakage current generating metal piece generates a simulated leakage current to automatically conduct an end-of life test of said circuit interrupting device.

22. The circuit interrupting device according to claim 21, wherein, when said circuit interrupting device is reset, said simulated leakage current generating metal piece is separated from said one of said pair of input flexible metal pieces and stops generating said simulated leakage current.

23. The circuit interrupting device according to claim 21, wherein said one of said pair of said input flexible metal pieces is a neutral input flexible metal piece.

24. The circuit interrupting device according to claim 21, wherein:

said pair of line terminals comprises a neutral line terminal and a hot line terminal, and wherein one end of said simulated leakage current generating metal piece is electrically connected to the neutral line terminal, and the other end of said simulated leakage current generating metal piece is in series with a simulated leakage current generating resistor and is electrically connected to the hot line terminal via a solenoid coil.

25. The circuit interrupting device according to claim 10, wherein said first metal switch piece has a contact which is mated with a contact on said second metal switch piece when said circuit interrupting device is in said reset state, and said contact of said first metal switch piece is separated from the contact on said second metal switch piece when said circuit interrupting device is in said tripped state.

26. The circuit interrupting device according to claim 25, wherein said mating of said first metal switch piece and said second metal switch piece allows said circuit interrupting device to trip when a ground fault is detected.

27. The circuit interrupting device according to claim 10, wherein when said circuit interrupting device is properly wired and in said tripped state, said first metal switch piece, said second metal switch piece, and said simulated leakage current generating metal piece are separated from each other.

28. The circuit interrupting device according to claim 25, wherein said simulated leakage current generating metal piece does not contact with said first metal switch piece or said second metal switch piece in either said tripped state or said reset state.

29. The circuit interrupting device according to claim 10, wherein one end of said first metal switch piece is electrically connected to a line terminal via a solenoid coil, and another end is suspended below said second metal switch piece.

30. The circuit interrupting device according to claim 29, wherein said line terminal is a hot line terminal.

31. The circuit interrupting device according to claim 30, wherein one end of said second metal switch piece is electrically connected to a neutral line terminal, and another end of said second metal switch piece is suspended above said first metal switch piece.

32. The circuit interrupting device according to claim 31, wherein said second metal switch piece is electrically connected to a positive pole of a silicon controlled rectifier (SCR).

33. The circuit interrupting device according to claim 32, wherein said mating of said first metal switch piece with said second metal switch piece allows said SCR to be electrically connected to said solenoid coil.

34. The circuit interrupting device according to claim 12, wherein said timer chip allows said circuit interrupting device to periodically conduct said end-of-life test by tripping said circuit interrupting device which triggers an automatic generation of a simulated leakage current by a simulated leakage current switch.

35. The circuit interrupting device according to claim 1, further comprising a power discharge mechanism, wherein during a high voltage surge said power discharge mechanism causes a discharge of electricity to protect said circuit interrupting device from being damaged due to said high voltage surge.

36. The circuit interrupting device of claim 1, further comprising:

a silicon controlled rectifier (SCR); and a reset start switch, which can only be closed for a duration of time when an user depresses said reset button and when said circuit interrupting device is in said tripped state, wherein said closing of said reset start switch allows said circuit interrupting device to reset on the condition that prior to or at the time said reset start switch is closed, a simulated leakage current signal is sent to a gate of the SCR.

37. The circuit interrupting device according to claim 36, wherein said reset start switch comprises a metal switch piece and an electric contact, wherein one end of said metal switch piece is electrically connected to one of said pair of line terminals via a solenoid coil and the other end is suspended, and wherein said electric contact is electrically connected to a positive pole of a silicon controlled rectifier (SCR).

38. The circuit interrupting device according to claim 36, wherein said simulated leakage current is generated by a simulated leakage current generating metal piece which is electrically connected to one of said pair of line terminals when said circuit interrupting device is properly wired and in said tripped state.

39. The circuit interrupting device according to claim 38, wherein said simulated leakage current signal is sent when components of said circuit interrupting device are working properly.

40. The circuit interrupting device according to claim 36, wherein said simulated leakage current signal is sent via a leakage current detection IC chip to a gate of said SCR.

41. The circuit interrupting device according to claim 36, wherein said closing of said reset start switch in the presence of said simulated leakage current signal allows a solenoid coil to be energized to urge a circuit interrupting assembly to move toward a circuit closing position to establish an electrical continuity of said circuit interrupting device.

42. The circuit interrupting device according to claim 36, wherein nothing happens to reset the device when said reset start switch closes in the absence of said simulated leakage current control signal.

43. The circuit interrupting device according to claim 37, wherein said closing of said reset start switch in the presence of said simulated leakage current signal allows said electric contact to be electrically connected to the other of said pair of line terminals.

44. The circuit interrupting device according to claim 43, wherein said one of said pair of line terminals is a hot line terminal, and the other of said pair of line terminals is a neutral line terminal.

45. The circuit interrupting device of claim 13, wherein the power discharge mechanism comprises:

a pair of input power connecting pieces, each being electrically connected to a hot or a neutral wire of said input power source respectively, wherein each of said input power connecting pieces has an end extended to a discharge metal piece having a tip, and wherein said tip of said discharge metal piece of one input power connecting piece faces, but does not contact with, said tip of said discharge metal piece from the other input power connecting piece.

46. The circuit interrupting device according to claim 45, wherein during a high voltage surge said discharge metal pieces of said input power connecting pieces cause a discharge of electricity through said tips of said discharge metal pieces to protect said circuit interrupting device from being damaged due to said high voltage surge.

47. The circuit interrupting device according to claim 45, wherein said high voltage surge is a lightning.

48. The circuit interrupting device according to claim 1, wherein one of said pair of line terminals is a hot line terminal and another of said pair of line terminals is a neutral line terminal and said hot line terminal is electrically connected to said neutral line terminal through a solenoid coil and a metal oxide varistor (MOV).

49. The circuit interrupting device according to claim 1, wherein said reset directional lock has a circular groove at a distal portion of said lower portion.

* * * * *